(12) United States Patent
Yoon et al.

(10) Patent No.: US 12,225,376 B2
(45) Date of Patent: Feb. 11, 2025

(54) METHOD AND APPARATUS FOR MANAGING EVENTS IN A WIRELESS COMMUNICATION SYSTEM

(71) Applicant: Samsung Electronics Co., Ltd., Suwon-si (KR)

(72) Inventors: Kangjin Yoon, Suwon-si (KR); Sujung Kang, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 373 days.

(21) Appl. No.: 17/720,806

(22) Filed: Apr. 14, 2022

(65) Prior Publication Data

US 2022/0338008 A1    Oct. 20, 2022

(30) Foreign Application Priority Data

Apr. 14, 2021 (KR) .................. 10-2021-0048425
May 18, 2021 (KR) .................. 10-2021-0064267
Aug. 13, 2021 (KR) .................. 10-2021-0107441

(51) Int. Cl.
*H04W 12/06* (2021.01)
*H04W 4/60* (2018.01)
*H04W 8/00* (2009.01)
*H04W 8/24* (2009.01)

(52) U.S. Cl.
CPC ............ *H04W 12/06* (2013.01); *H04W 4/60* (2018.02); *H04W 8/005* (2013.01); *H04W 8/245* (2013.01)

(58) Field of Classification Search
CPC .................................................. H04W 12/06

USPC ........................................................ 455/411
See application file for complete search history.

(56) References Cited

U.S. PATENT DOCUMENTS

| | | | |
|---|---|---|---|
| 2014/0087691 A1* | 3/2014 | Babbage ............... | H04L 9/0869 455/411 |
| 2016/0105411 A1* | 4/2016 | Vallieres ................. | H04L 67/01 726/3 |
| 2018/0176778 A1* | 6/2018 | Amiel ..................... | H04W 12/35 |
| 2019/0075453 A1* | 3/2019 | Yoon ....................... | H04W 8/245 |
| 2019/0140837 A1* | 5/2019 | Cheng ..................... | H04W 8/20 |
| 2019/0349751 A1* | 11/2019 | Park ......................... | H04W 8/24 |

(Continued)

FOREIGN PATENT DOCUMENTS

| | | |
|---|---|---|
| KR | 10-2021-0123191 A | 10/2021 |
| WO | 2018/129723 A1 | 7/2018 |
| WO | 2020/035150 A1 | 2/2020 |

OTHER PUBLICATIONS

International Search Report dated Jul. 12, 2022, issued in International Application No. PCT/KR2022/005414.

(Continued)

*Primary Examiner* — Qutbuddin Ghulamali
(74) *Attorney, Agent, or Firm* — Jefferson IP Law, LLP

(57) ABSTRACT

A method performed by a subscription manager discovery service (SM-DS) server in a wireless communication system is provided. The method includes performing a mutual authentication procedure with a terminal, generating an event checking identifier (ECID) associated with an embedded universal integrated circuit card (eUICC) identifier (EID), and transmitting, to the terminal, a message including the ECID, wherein the ECID is stored in the terminal and associated with an address of the SM-DS server.

15 Claims, 11 Drawing Sheets

(56) References Cited

U.S. PATENT DOCUMENTS

2020/0196131 A1* 6/2020 Fan .................. H04W 8/205
2021/0314772 A1 10/2021 Koo et al.

OTHER PUBLICATIONS

Extended European Search Report dated Jun. 14, 2024, issued in European Patent Application No. 22788471.5.

* cited by examiner

METHOD AND APPARATUS FOR MANAGING EVENTS IN A WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0048425, filed on Apr. 14, 2021, in the Korean Intellectual Property Office, of a Korean patent application number 10-2021-0064267, filed on May 18, 2021, in the Korean Intellectual Property Office, and of a Korean patent application number 10-2021-0107441, filed on Aug. 13, 2021, in the Korean Intellectual Property Office, the disclosure of each of which is incorporated by reference herein in its entirety.

BACKGROUND

1. Field

The disclosure relates to a method and an apparatus for providing event checking information of a registered event by an opening mediation server. More particularly, The disclosure relates to a method and an apparatus for issuing, registering, and updating an event checking identifier for even checking by a terminal and an opening mediation server.

The disclosure relates to a method and an apparatus wherein a profile server registers events in at least one opening mediation server or deletes events therefrom.

The disclosure relates to a method and an apparatus for downloading a communication service to a terminal and installing the communication service, thereby connecting communication in a communication system.

The disclosure relates to a method and an apparatus for downloading, installing, and managing profiles online in a communication system.

2. Description of Related Art $5^{th}$ generation (5G) mobile communication technologies define broad frequency bands such that high transmission rates and new services are possible, and can be implemented not only in "Sub 6 GHz" bands, such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, new radio user equipment (NR UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and artificial intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus wherein a terminal selects a communication service in a communication system so as to connect communication.

Another aspect of the disclosure is to provide a method and an apparatus wherein a terminal downloads a profile for communication connection online, installs the same, and manages the same.

Another aspect of the disclosure is to provide a method and an apparatus wherein a terminal can efficiently downloads an event in a communication system.

Another aspect of the disclosure is to provide a method and an apparatus for accessing, by a terminal, at least one opening mediation server, and identifying presence/absence of an event assigned to the terminal.

Another aspect of the disclosure is to provide a method and an apparatus wherein a terminal accesses at least one opening mediation server and acquires an event allocated to the terminal.

Another aspect of the disclosure is to provide a method and an apparatus wherein a profile providing server registers an identical event in at least one opening mediation server.

Another aspect of the disclosure is to provide a method and an apparatus for, when a profile providing server registers an event in at least one opening mediation server, selecting whether to provide an even checking function.

Another aspect of the disclosure is to provide a method and an apparatus wherein a profile providing server deletes an event registered in at least one opening mediation server.

Another aspect of the disclosure is to provide a method and an apparatus for exchanging messages between an opening mediation server (SM-DS) and a profile providing server (SM-DP+).

Additional aspects will be set forth in part in the description which follows and, in part, will be apparent from the description, or may be learned by practice of the presented embodiments.

In accordance with an aspect of the disclosure, a method performed by a subscription manager discovery service (SM-DS) server in a wireless communication system is provided. The method includes performing a mutual authentication procedure with a terminal, generating an event checking identifier (ECID) associated with an embedded universal integrated circuit card (eUICC) identifier (EID), and transmitting, to the terminal, a message including the ECID, wherein the ECID is stored in the terminal and associated with an address of the SM-DS.

In accordance with another aspect of the disclosure, a method performed by a terminal in a wireless communication system is provided. The method includes performing a mutual authentication procedure with a subscription manager discovery service (SM-DS) server, receiving, from the SM-DS server, a message including an event checking identifier (ECID) associated with an embedded universal integrated circuit card (eUICC) identifier (EID), and storing the ECID associated with an address of the SM-DS server.

In accordance with another aspect of the disclosure, a subscription manager discovery service (SM-DS) server in a wireless communication system is provided. The SM-DS server includes a transceiver, and at least one processor coupled with the transceiver, the at least one processor configured to perform a mutual authentication procedure with a terminal, generate an event checking identifier (ECID) associated with an embedded universal integrated circuit card (eUICC) identifier (EID), and transmit, to the terminal, a message including the ECID, wherein the ECID is stored in the terminal and associated with an address of the SM-DS server.

In accordance with another aspect of the disclosure, a terminal in a wireless communication system is provided. The terminal includes a transceiver, and at least one processor coupled with the transceiver, the at least one processor configured to perform a mutual authentication procedure with a subscription manager discovery service (SM-DS) server, receive, from the SM-DS server, a message including an event checking identifier (ECID) associated with an embedded universal integrated circuit card (eUICC) identifier (EID), and store the ECID associated with an address of the SM-DS server.

The technical subjects pursued in the disclosure may not be limited to the above-mentioned technical subjects, and other technical subjects which are not mentioned may be clearly understood, through the following descriptions, by those skilled in the art to which the disclosure pertains.

According to various embodiments of the disclosure, a terminal in a communication system may request an event registered in at least one opening mediation server.

According to an embodiment of the disclosure, in a communication system, a terminal may request event checking of an event registered in at least one opening mediation server.

According to various embodiments of the disclosure, a profile providing server in a communication may generate an event at the request of an operator server and may register the corresponding event in at least one opening mediation server.

According to an embodiment of the disclosure, in a communication system, a profile providing server may generate an event according to a request of an operator server, register the corresponding event in at least one opening mediation server, and permit the opening mediation server to use an even checking function for the corresponding event.

According to various embodiments of the disclosure, a profile providing server in a communication system may include a message, when requesting an opening mediation server to register an event, configured such that, after the opening mediation server registers the event, a third opening mediation server is requested to register an event corresponding to the event.

According to an embodiment of the disclosure, in a communication system, when a terminal accesses an opening mediation server, and requests event checking, the terminal may provide an event checking identifier.

According to an embodiment of the disclosure, in a communication system, an opening mediation server may provide an event checking identifier to a terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
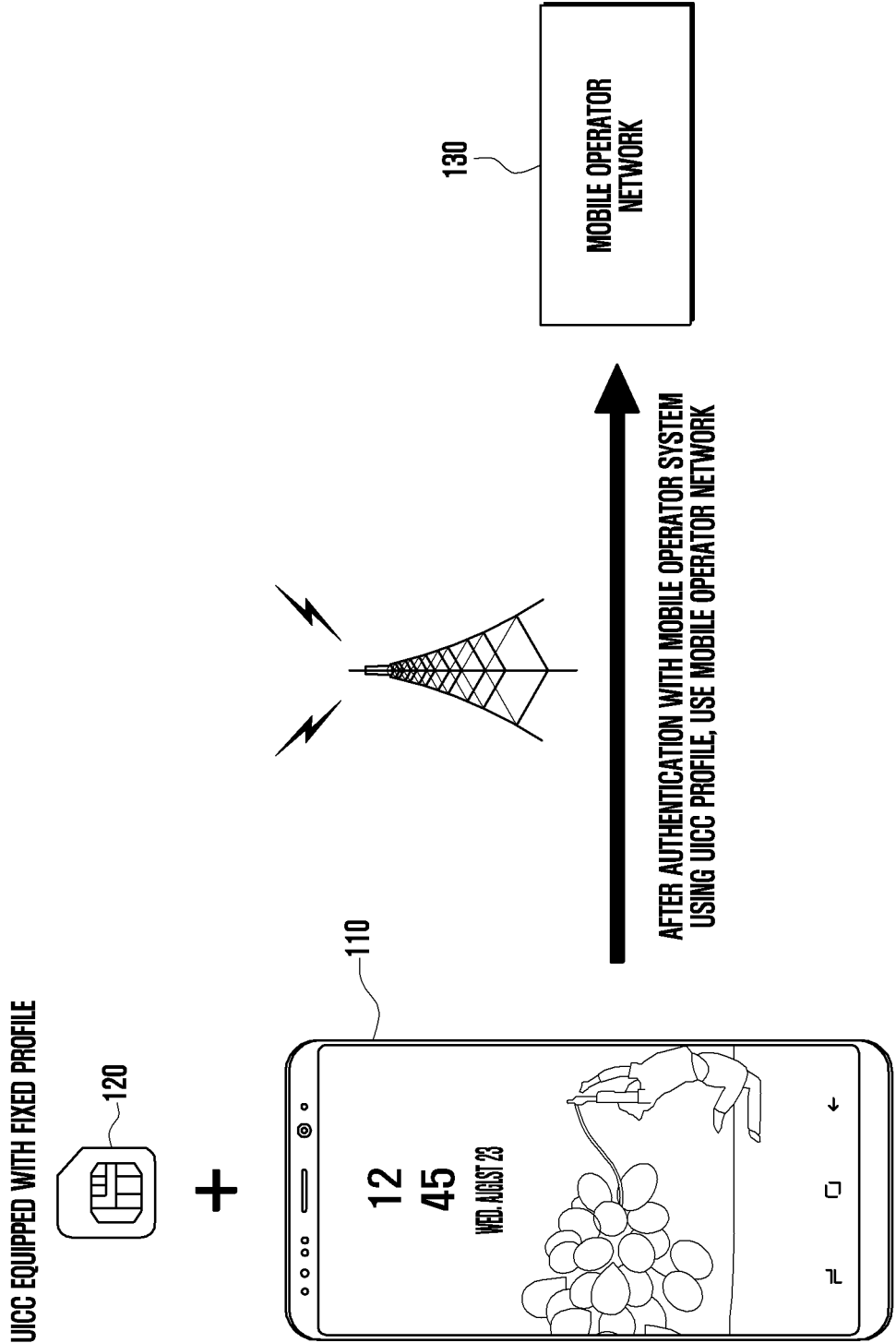
FIG. 1 is a diagram illustrating a method of connecting a user equipment (UE) to a mobile communication network using a universal integrated circuit card (UICC) having a fixed profile mounted thereon according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numeral.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card.

Specific terms used in the following description are provided to help the understanding of the disclosure, and the use of these specific terms may be changed to other forms without departing from the technical spirit of the disclosure.

In the disclosure, modifiers, such as "first" and "second", indicating terms may be used to distinguish between terms in describing embodiments. Terms modified by modifiers, such as "first" and "second", may indicate different objects. However, terms modified by modifiers, such as "first" and "second", may indicate the same object. For example, modifiers, such as "first" and "second", may be used to indicate the same object in different points of view. For example, modifiers, such as "first" and "second", may be used to distinguish between the same object in terms of function or operation. For example, a first user and a second user may indicate the same user.

First, terms used in the disclosure are defined.

A universal integrated circuit card (UICC) is a smart card inserted into a mobile communication terminal and used, and is also called a UICC card. The UICC may include an access control module for accessing a network of a mobile operator. Examples of the access control module include a universal subscriber identity module (USIM), a subscriber identity module (SIM), an IP multimedia service identity module (ISIM), and the like. A UICC including a USIM is usually called a USIM card. Similarly, a UICC including a SIM module is commonly referred to as a SIM card.

The terms "SIM card", "UICC card", "USIM card", and "UICC including ISIM" disclosed in the disclosure may be used as the same meaning in the disclosure. For example, even for a SIM card, the technical application can be equally applied to a USIM card, an ISIM card, or a general UICC card.

The SIM card may store personal information of mobile communication subscribers, and may perform subscriber authentication and traffic security key generation when accessing a mobile communication network, thereby enabling safe mobile communication use.

At the time of proposing the disclosure, a SIM card is generally manufactured as a dedicated card for a corresponding operator at the request of a specific mobile communication operator during card manufacturing, and authentication information for network access of the corresponding operator, for example, a universal subscriber identity module (USIM) application, international mobile subscriber identity (IMSI), K value, OPc value, or the like, are loaded on the card in advance and shipped. Therefore, the manufactured SIM card is delivered to a corresponding mobile operator and provided to subscribers. After that, if necessary, it is possible to manage the installation, modification, and deletion of applications within the UICC by using technologies, such as over-the-air (OTA). The subscribers can use the network and application services of a corresponding mobile operator by inserting a UICC card into their own mobile communication terminals. When replacing the terminal, by moving and inserting the UICC card from an existing terminal to a new terminal, authentication information, mobile communication phone number, and personal phone book stored in the UICC card can be used as it is in the new terminal.

However, the SIM card is inconvenient for users of mobile communication terminals to receive services from other mobile operators. It is inconvenient for a user of a mobile communication terminal to physically obtain a SIM card in order to receive a service from a mobile operator. For example, when traveling to another country, it is inconvenient to obtain a local SIM card in order to receive a local mobile communication service. In the case of roaming service, it addresses the inconvenience to some extent, but the fee is relatively high, and there is a problem that the service cannot be received if there is no contract between the mobile operators.

Meanwhile, when a SIM module is remotely downloaded and installed on the UICC card, this inconvenience can be largely addressed. For example, a SIM module of a mobile communication service that a user wants to use at a desired time can be downloaded to the UICC card. Such a UICC card can also be used by downloading and installing a plurality of SIM modules and selecting only one SIM module among them. Such a UICC card may or may not be fixed to the terminal. In particular, a UICC that is fixed to a terminal and used is called an embedded UICC (eUICC). In general, the eUICC refers to a UICC card that is fixed to the terminal and used, and can download and select a SIM module remotely. In the disclosure, a UICC card that can remotely download and select a SIM module is collectively referred to as an eUICC. For example, among the UICC cards that can remotely download and select the SIM module, UICC cards that are fixed or not fixed to the terminal are collectively used as eUICCS. In addition, the downloaded SIM module information is collectively used as the term eUICC profile or, more simply, profile.

Hereinafter, the terms used in the disclosure will be described below.

In the disclosure, UICC is a smart card that is inserted into a mobile communication terminal and used, and personal information, such as network access authentication information, phone book, and SMS of a mobile communication subscriber is stored in the UICC. When accessing a mobile communication network, such as GSM, WCDMA, LTE, or the like, the UICC refers to a chip that enables secure mobile communication by performing subscriber authentication and traffic security key generation. The UICC is loaded with communication applications, such as subscriber identification module (SIM), universal SIM (USIM), and IP Multimedia SIM (ISIM) depending on the type of mobile communication network the subscriber accesses, and may provide a high-level security function for loading various applications, such as electronic wallet, ticketing, e-passport, or the like.

In the disclosure, an eUICC (embedded UICC) is a security module in the form of a chip embedded in a terminal, not a removable type that can be inserted into and removed from the terminal. The eUICC can download and install a profile using over-the-air (OTA) technology. The eUICC can be named as a UICC that can download and install a profile.

In the disclosure, a method of downloading and installing a profile using the OTA technology in the eUICC may be applied to a removable UICC that can be inserted into and removed from a terminal. For example, an embodiment of the disclosure can be applied to a UICC that can download and install a profile using the OTA technology.

In this disclosure, the term UICC may be used interchangeably with SIM, and the term eUICC may be used interchangeably with eSIM.

In the disclosure, a profile may mean that an application, a file system, an authentication key value, or the like, stored in the UICC are packaged in the form of software.

In the disclosure, a USIM Profile may have the same meaning as a profile or may mean that information included in a USIM application within the profile is packaged in the form of software.

In the disclosure, an operation of a terminal enabling a profile means an operation of changing the state of the profile to an enabled state and configuring the terminal to receive a communication service through a mobile operator that provided the profile. The profile in the enabled state may be expressed as an "enabled profile".

In the disclosure, an operation of a terminal disabling a profile means an operation of changing the state of the profile to a disabled state and configuring the terminal not to receive a communication service through a mobile operator that provided the profile. The profile in the disabled state may be expressed as a "disabled profile".

In the disclosure, an operation of a terminal deleting a profile may mean an operation of changing the state of the profile to a deleted state and configuring the terminal so that the profile can no longer be enabled or disabled. The profile in the deleted state may be expressed as a "deleted profile".

In the disclosure, an operation of a terminal enabling, disabling, or deleting a profile may mean an operation of only marking each profile as to be enabled, to be disabled, or to be deleted without immediately changing the state of each profile to the enabled state, the disabled state, or the deleted state, and changing the state of each profile to be enabled, disabled, or deleted after the terminal or the UICC of the terminal performs a specific operation (e.g., performing a refresh (REFRESH) or initialization (RESET) command). The operation of marking a specific profile to be in a predetermined state (i.e., to be enabled, to be disabled, or to be deleted) is not necessarily limited to displaying one predetermined state for one profile. It is also possible to display one or more profiles in the same or different predetermined states, display one profile in one or more predetermined states, or display one or more profiles in one or more predetermined states equal to or different from each other, respectively.

In addition, when the terminal displays one or more predetermined states for an arbitrary profile, the two displays may be combined into one. For example, when a certain profile is marked as to be disabled and to be deleted, the profile may also be combined and displayed as to be disabled and deleted.

In addition, an operation of a terminal displaying the predetermined state for one or more profiles may be performed sequentially or simultaneously. In addition, an operation of a terminal displaying the predetermined state for one or more profiles and then changing the actual profile state may be performed sequentially or simultaneously.

In the disclosure, the profile providing server includes a function of generating a profile, encrypting a generated profile, generating a profile remote management command, or encrypting a generated profile remote management command, and may be expressed as subscription manager data preparation (SM-DP), subscription manager data preparation plus (SM-DP+), off-card entity of profile domain, profile encryption server, profile creation server, profile provisioner (PP), profile provider, or profile provisioning credentials holder (PPC holder).

In the disclosure, the profile management server may be expressed as subscription manager secure routing (SM-SR), subscription manager secure routing plus (SM-SR+), off-card entity of eUICC profile manager or profile management credentials holder (PMC holder), or eUICC Manager (EM).

When referring to the profile providing server in the disclosure, it may also refer to a combination of the functions of the profile management server. Therefore, in various embodiments of the disclosure, that is, in the following description, the operation of the profile providing server is also possible in the profile management server. In the same manner, obviously, operations describing the profile management server or SM-SR may be performed in the profile providing server.

In the disclosure, the opening mediation server may be expressed as a subscription manager discovery service (SM-DS), a discovery service (DS), a root opening mediation server (root SM-DS), or an alternative opening mediation server (alternative SM-DS). The opening mediation server may receive an event registration request (register event request or event register request) from one or more profile providing servers or opening mediation servers. In addition, one or more opening mediation servers may be used in combination. In this case, a first opening mediation server may receive an event registration request from a second opening mediation server as well as the profile providing server.

In the disclosure, the profile providing server and the opening mediation server may be collectively referred to as "remote SIM provisioning (RSP) server". The RSP server may be expressed as subscription manager XX (SM-XX) 750 or 850.

In the disclosure, eSIM capability may be collectively referred to as "remote SIM provisioning capability, or RSP capability".

The term "terminal" used in the disclosure is a mobile station (MS), user equipment (UE), user terminal (UT), wireless terminal, access terminal (AT), terminal, subscriber unit, subscriber station (SS), wireless device, wireless communication device, wireless transmit/receive unit (WTRU), mobile node, mobile, or other terms. Various embodiments of the terminal include cellular phones, smart phones having a wireless communication function, personal digital assistants (PDAs) having a wireless communication function, wireless modems, portable computers having a wireless communication function, photographing devices, such as a digital camera having a wireless communication function, gaming devices having a wireless communication function, music storage and playback home appliances having a wireless communication function, and Internet home appliances capable of wireless Internet access and browsing, as well as portable units or terminals incorporating combinations of such functions. In addition, the terminal may include a machine to machine (M2M) terminal and a machine type communication (MTC) terminal/device, but is not limited thereto. In the disclosure, a terminal may be referred to as an electronic device.

In the disclosure, the electronic device may have a built-in UICC that can download and install a profile. When the UICC is not embedded in the electronic device, the UICC physically separated from the electronic device may be inserted into the electronic device and connected to the electronic device. For example, the UICC in the form of a card may be inserted into the electronic device. The electronic device may include a terminal, and in this case, the terminal may be a terminal including a UICC that can download and install a profile. The UICC may be embedded in the terminal, and when the terminal and the UICC are separated, the UICC may be inserted into the terminal and connected to the terminal. The UICC that can download and install a profile may be referred to as, for example, eUICC.

In the disclosure, the terminal or electronic device may include software or an application installed in the terminal or electronic device to control the UICC or eUICC. The software or application installed in the terminal or electronic device to control the UICC or eUICC may be referred to as, for example, a local profile assistant (LPA).

In the disclosure, a profile identifier may be referred to as a factor matching a profile ID, an integrated circuit card ID (ICCID), a matching ID, an event ID, an activation code, an activation code token, a command code, a command code token, a signed command code, an unsigned command code, an ISD-P, or profile domain (PD). The profile ID may indicate a unique identifier of each profile. The profile ID may further include the address of the profile providing server (SM-DP+) that can index the profile. In addition, the profile ID may further include a signature of the profile providing server (SM-DP+).

In the disclosure, an eUICC identifier (eUICC ID) may be a unique identifier of the eUICC embedded in the terminal, and may be referred to as an EID. In addition, when a provisioning profile is pre-loaded in the eUICC, the eUICC ID may be a profile ID of a corresponding provisioning profile. In addition, as in an embodiment of the disclosure, when the terminal and the eUICC chip are not separated, the eUICC ID may be a terminal ID. In addition, the eUICC ID may refer to a specific secure domain of the eUICC chip.

In the disclosure, a profile container may be called a profile domain. The profile container may be a security domain.

In the disclosure, an application protocol data unit (APDU) may be a message for the terminal to interwork with the eUICC. In addition, the APDU may be a message for the PP or PM to interwork with the eUICC.

In the disclosure, profile provisioning credentials (PPC) may be a means used for mutual authentication, profile encryption, and signature between the profile providing server and the eUICC. The PPC may include one or more of a symmetric key, a Rivest Shamir Adleman (RSA) certificate and a private key, an elliptic curved cryptography (ECC) certificate and a private key, a root certification authority (CA), and a certificate chain. In addition, when there are a plurality of profile providing servers, different PPCs for each of the plurality of profile providing servers may be stored or used in the eUICC.

In the disclosure, profile management credentials (PMC) may be a means used for mutual authentication and transmission data encryption and signing between the profile management server and the eUICC. The PMC may include one or more of a symmetric key, an RSA certificate and a private key, an ECC certificate and a private key, a root CA, and a certificate chain. In addition, when there are a plurality of profile management servers, different PMCs for each of the plurality of profile management servers can be stored or used in the eUICC.

In the disclosure, an AID may be an application identifier. This value may be a delimiter that distinguishes different applications within the eUICC.

In the disclosure, an event may be a general term for profile download, remote profile management, or other profile or eUICC management/processing commands. The event may be named as a remote SIM provisioning operation (RSP operation) or an event record, and each event may be referred to as data including at least one of a corresponding event identifier (event ID or eventID) or matching identifier (matching ID or MatchingID), the address (e.g., fully qualified domain name (FQDN), IP address, or uniform resource locator (URL)) of a profile providing server (SM-DP+) or an opening mediation server in which the event is stored, the signature of the profile providing server (SM-DP+) or the opening mediation server (SM-DS), and the digital certificate of the profile providing server (SM-DP+) or the opening mediation server (SM-DS). Data corresponding to the event may be referred to as an activation code or a command code. A part or all of a procedure for using a command code may be referred to as "activation code processing procedure", "command code processing procedure", "activation code procedure", "command code procedure", "local profile assistant application programming interface (LPA API) procedure", "LPA API procedure", or "LPA API processing procedure". The profile download may be mixed with profile installation. In addition, an event type may also be used as a term to indicate whether a particular event is a profile download, remote profile management (e.g., delete, enable, disable, replace, update, or the like), or other profile or eUICC management/processing command, and may be named as an operation type, an operation class (operation-class), an event request type, an event classification (event class), an event request classification (event request class), or the like. As for an arbitrary event identifier (eventID or matchingID), a path or usage purpose (eventID Source or matchingID Source) from which the terminal obtained the corresponding event identifier (eventID or matchingID) may be designated.

In the disclosure, event checking may be a term of collectively indicating operations in which a terminal identifies, for an opening mediation server, whether there is an event registered for an eUICC of the terminal. Event checking may be performed without a mutual authentication process between a terminal and an opening mediation server, or performed during a mutual authentication process.

In the disclosure, an event checking identifier (ID) (ECID) may be a term of collectively indicating identifiers provided by a terminal to an opening mediation server so as to identify whether there is an event registered in the opening mediation server. An event checking identifier may be generated based on an eUICC identifier of a terminal and an address of an opening mediation server. An event checking identifier may be generated by at least one of a terminal, an opening mediation server, a profile providing server, and a service provider.

In the disclosure, a profile package may be used interchangeably with a profile or may be used as a term indicating a data object of a specific profile, and may be named as a profile TLV or a profile package TLV. When the profile package is encrypted using an encryption parameter, it may be named as a protected profile package (PPP) or a protected profile package TLV (PPP TLV). When the profile package is encrypted using an encryption parameter that can only be decrypted by a specific eUICC, the profile package may be named as a bound profile package (BPP) or a bound profile package TLV (BPP TLV). The profile package TLV may be a data set expressing information constituting a profile in a TLV (tag, length, value) format.

In the disclosure, local profile management (LPM) may be named as profile local management, local management, local management command, local command, local profile management package (LPM Package), a profile local management package, a local management package, a local management command package, or a local command package. The LPM may be used for updating the states (enabled, disabled, or deleted) of a specific profile through software installed in a terminal, or updating the contents of a specific profile (e.g., a profile nickname or profile summary information (profile metadata), or the like). The LPM may include one or more local management commands. In this case, a target profile of each local management command may be the same or different for each local management command.

In the disclosure, remote profile management (RPM) may be named as profile remote management, remote management, remote management command, remote command, remote profile management package (RPM Package), profile remote management package, remote management package, remote management command package, and remote command package. The RPM may be used for updating the states (enabled, disabled, or deleted) of a specific profile or updating the contents of a specific profile (e.g., a profile nickname, or profile summary information (profile metadata), or the like). The RPM may include one or more remote management commands. In this case, a target profile of each remote management command may be the same or different for each remote management command.

In the disclosure, a certificate or digital certificate may indicate a digital certificate used in asymmetric key-based mutual authentication including a pair of a public key (PK) and a secret key (SK). Each certificate includes one or more public keys (PK), a public key identifier (PKID) corresponding to each public key, and an identifier and digital signature of a certificate issuer (CI) that issued the corresponding certificate.

In addition, the certificate issuer may be named as a certification issuer, a certificate authority (CA), a certification authority, and the like.

In the disclosure, a public key (PK) and a public key identifier (PKID) may be used interchangeably with the same meaning as a certificate including a specific public key or a corresponding public key, a part of a specific public key or a part of a certificate including a corresponding public key, an operation result (e.g., Hash) value of a specific public key and an operation result (e.g., Hash) value of a certificate including a corresponding public key, an operation result (e.g., Hash) value of a part of a specific public key and an operation result (e.g., Hash) value of a part of a certificate including a corresponding public key, or a storage space in which data is stored.

In the disclosure, certificates (primary certificate) issued by one certificate issuer are used to issue another certificate (secondary certificate), or when secondary certificates are used to issue tertiary or higher certificates in conjunction, the correlation between the certificates can be named as certificate chain or certificate hierarchy. At this time, a CI certificate used for the initial certificate issuance is root of certificate, top certificate, root CI, root CI certificate, root CA, or root CA certificate.

In the disclosure, a mobile operator may be collectively referred to all of a business that provides a communication service to a terminal, a business supporting system (BSS), an operational supporting system (OSS), a point of sale (POS) terminal, and other IT systems. In addition, in the disclosure, the communication operator is not limited to expressing only one specific business entity that provides communication services, and the communication operator may be used as a term referring to a group or association (association or consortium) of one or more businesses or a representative representing the group or association. In addition, in the disclosure, the mobile operator may be named as an operator (OP or Op.), a mobile network operator (MNO), a service provider (SP), a profile owner (PO), or the like, and each mobile operator may configure or be assigned at least one name and/or an object identifier (OID) of the mobile operator. When the mobile operator refers to a group or association or representative of more than one business entity, the name or unique identifier of an arbitrary group or association or representative can be a name or a unique identifier shared by all entities affiliated with the corresponding group or association or all entities collaborating with the representative.

In the disclosure, AKA may indicate authentication and key agreement, and may indicate an authentication algorithm for accessing 3GPP and 3GPP2 networks.

In the disclosure, K is an encryption key value stored in an eUICC used for the AKA authentication algorithm.

In the disclosure, OPc is a parameter value that may be stored in the eUICC used for the AKA authentication algorithm.

In the disclosure, NAA is a network access application program, and may be an application program, such as USIM or ISIM stored in UICC to access a network. The NAA may be a network access module.

In the disclosure, an indicator may be used for expressing that an arbitrary function, configuration, or operation is required or not required, or may also be used for expressing the corresponding function, configuration, or operation itself. In addition, in the disclosure, the indicator may be expressed in various forms, such as a character string or an alphanumeric string, an operator representing true/false (Boolean—TRUE or FALSE), a bitmap, an array, or the like. Other expressions with the same meaning can be mixed.

In describing the disclosure, if it is determined that a detailed description of a related known function or configuration may unnecessarily obscure the gist of the disclosure, the detailed description thereof will be omitted.

FIG. 1 is a diagram illustrating a method of connecting a terminal to a mobile communication network using a UICC having a fixed profile mounted thereon according to an embodiment of the disclosure.

Referring to FIG. 1, a UICC 120 may be inserted into a terminal 110. For example, the UICC 120 may be removable or may be pre-built in the terminal.

A fixed profile loaded to UICC means that "access information" that can access a specific mobile operator is fixed. For example, the access information may be an IMSI that is a subscriber identifier and a K or Ki value required to be authenticated to a network together with the IMSI.

The terminal 110 according to an embodiment of the disclosure may perform authentication with an authentication processing system (e.g., home location register (HLR) or AuC) of a mobile operator using the UICC 120. For example, the authentication process may be an authentication and key agreement (AKA) process. When the authentication is successful, the terminal may use a mobile communication service, such as a phone call or use of mobile data using a network 130 of the mobile operator of a mobile communication system.

Figure 2:
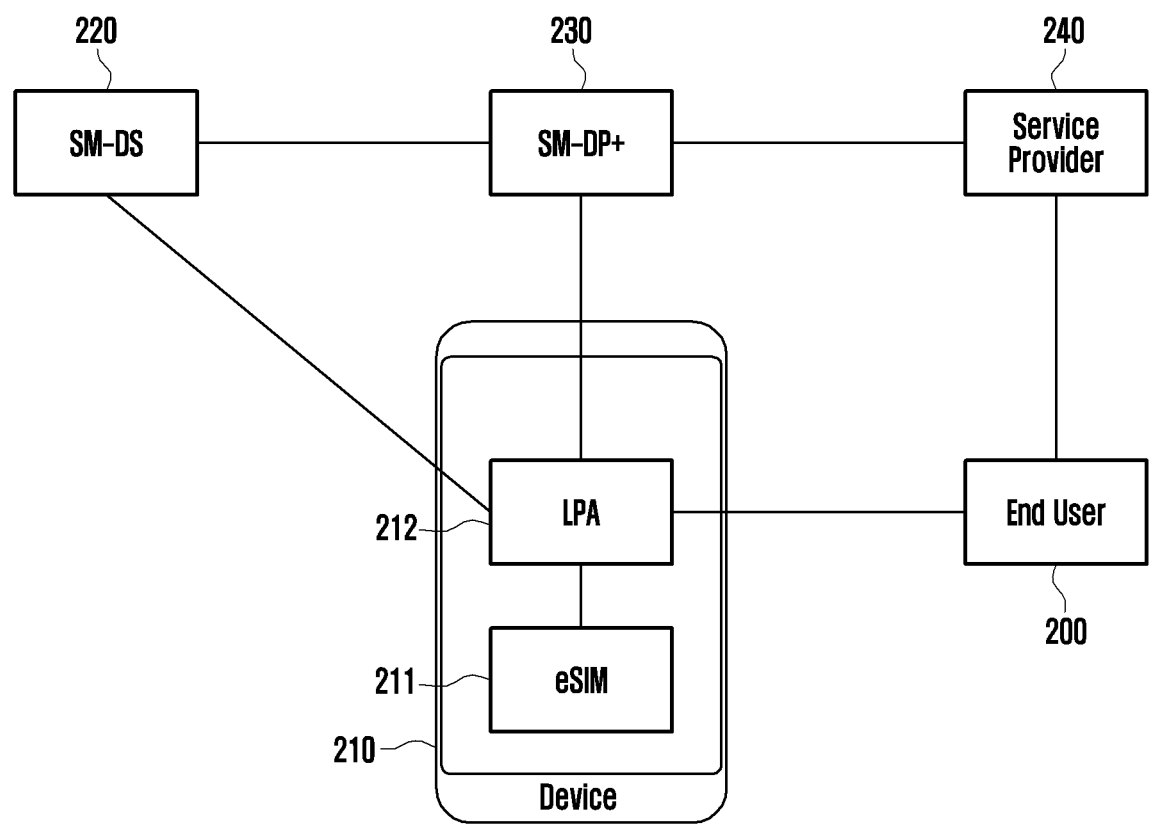
FIG. 2 is a diagram illustrating a connection between a terminal, an opening mediation server, a profile providing server, and a service provider according to an embodiment of the disclosure.

FIG. 2 is a diagram illustrating a connection between a terminal, an opening mediation server, a profile providing server, and a service provider according to an embodiment of the disclosure.

Referring to FIG. 2, a terminal 210 may include an eSIM 211 mounted therein, and the eSIM 211 may include a profile (not illustrated) installed therein. In addition, the terminal 210 may include an LPA 212 installed therein. The eSIM 211 may be controlled by the LPA 212. A user 200 may install a profile in the eSIM 211 of each terminal via the LPA 212, or control an installed profile via same.

The user 200 may receive a communication service from a service provider (hereinafter, "communication service provider" or "operator") 240. To this end, a profile (not illustrated) of the operator 240 may be installed in the terminal 210.

The operator 240 may be connected to a profile providing server 230 (e.g., SM-DP+), and the LPA 212 of the terminal 210 may be connected to the profile providing server 230 and an opening mediation server 220 (e.g., SM-DS). In FIG. 2, for convenience, the profile providing server 230 and the opening mediation server 220 are illustrated to be configured by single servers, respectively. However, according to implementation and an embodiment of the disclosure, one or more profile servers (SM-DP+) may be included in a server configuration, and one or more opening mediation servers (SM-DS) assisting to establish a connection between a particular profile server and a terminal may be included in a server configuration. As described above, it should be noted that a configuration of various servers may also be represented in brief by a single profile server in the following drawings.

Detailed operations and message exchange procedures of the user 200, the operator 240, the terminal 210, the eSIM 211, the LPA 212, the profile providing server 230, and the opening mediation server 220 according to an embodiment of the disclosure will be discussed with reference to the following drawings described later.

An address (e.g., FQDN, IP address, or URL) of the opening mediation server 220 may be stored in the terminal 210 or the LPA 212, or the eSIM 211.

Referring to FIG. 2, the opening mediation server 220 may be connected to the profile providing server 230. For example, the profile providing server 230 may generate a particular event, and register the generation of the corresponding event in the opening mediation server 220. Information provided by the profile providing server 230 to the opening mediation server 220 so as to register generation of an event may include at least one of the following contents.

Forwarding indicator,
Address (FQDN, or fully qualified domain name) of the profile providing server,
Unique object identifier (object ID or OID) of the profile providing server,
IP address of the profile providing server,
Event identifier (EventID or MatchingID) generated in the profile providing server,
eSIM identifier (hereinafter, eUICC identifier or EID) aimed for by an event generated in the profile providing server,
Identifier (EventCheckingSupport) indicating whether use of an event checking function is allowed for the corresponding event, and/or
Event checking identifier (event checking ID or ECID) connected to an eUICC identifier to be used for identification of the event Detailed operations and message exchange procedures between the user 200, the terminal 210, the eSIM 211, the LPA 212, the opening mediation server 220, the profile providing server 230, and the operator 240 according to various embodiments of the disclosure will be discussed below.

Figure 3:
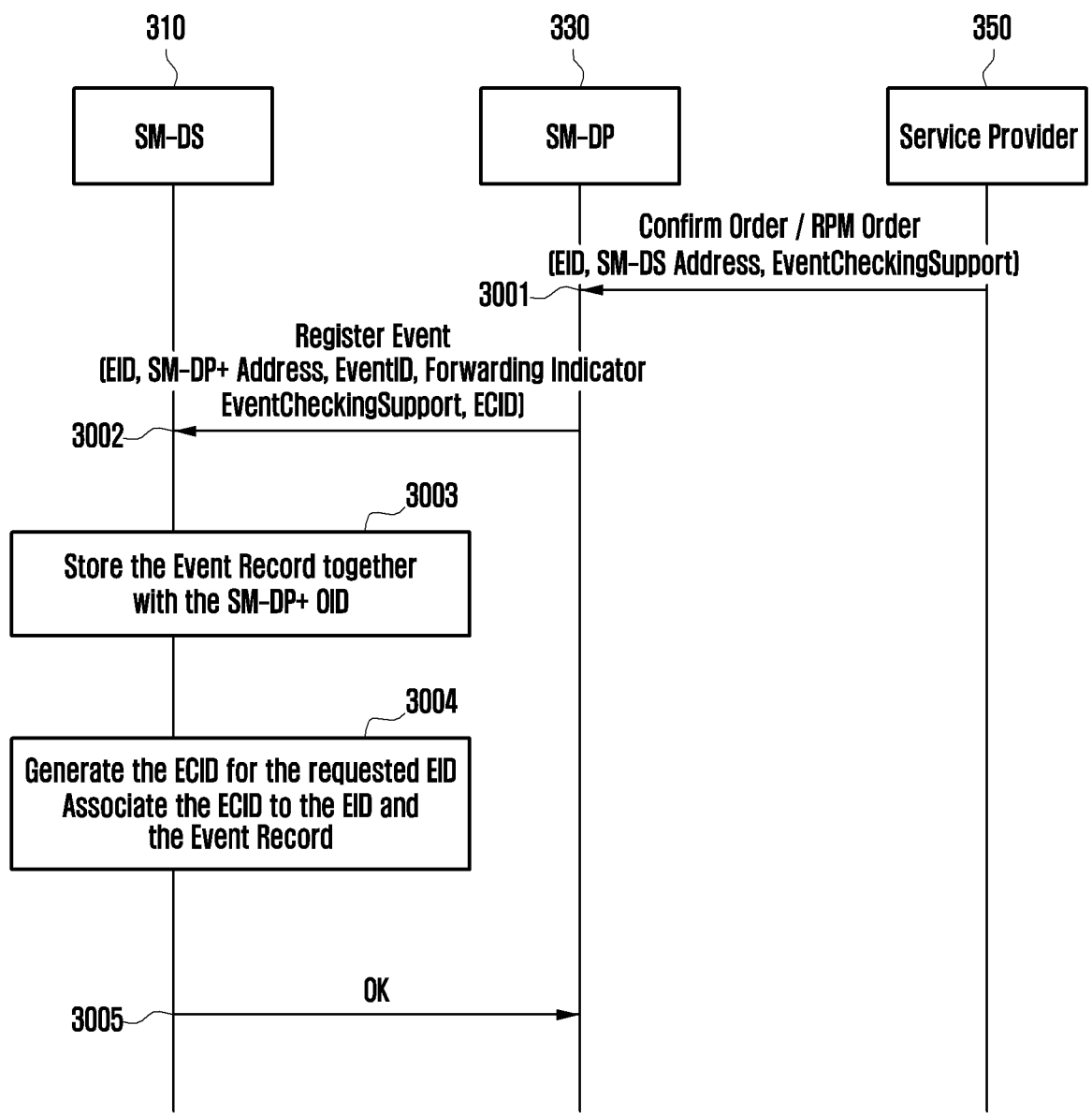
FIG. 3 is a diagram illustrating a message exchange procedure in which a profile providing server registers event generation in an opening mediation server according to an embodiment of the disclosure.

FIG. 3 is a diagram illustrating a message exchange procedure in which a profile providing server registers event generation in an opening mediation server according to an embodiment of the disclosure.

Referring to FIG. 3, in operation 3001, an operator 350 may command a profile providing server 330 (e.g., SM-DP) to generate an event corresponding to at least one of commands for remote management of a profile to be downloaded or a profile installed in a terminal. The operator 350 may selectively include at least one of the following pieces of information in a command to generate the event and transmit, to the profile providing server 330, the command Identifier (eUICC ID or EID) of an eUICC in a terminal (not illustrated) aimed for by the event,
Address (SM-DS address) of at least one opening mediation server in which information of a generated event is to be registered in the opening mediation server, and/or
Identifier (EventCheckingSupport) indicating whether the opening mediation server is allowed to use an event checking function for the corresponding event In operation 3001, the profile providing server 330 may generate an event according to a request of the operator 350.

In operation 3002, the profile providing server 330 may register the generated event in an opening mediation server 310 (e.g., SM-DS). For example, the event registration operation according to operation 3002 may include an operation of transmitting, to the opening mediation server 310, an event registration request message (Register Event Request) selectively including at least one of the following pieces of information.

Event identifier (EventID or MatchingID),
Identifier (eUICC ID or EID) of an eUICC in a terminal (not illustrated),
Address (SM-DP+ address) of the at least one profile providing server 330,
Forwarding indicator configured as "False",
Identifier (EventCheckingSupport) indicating whether use of an event checking function is allowed, and/or
Event checking identifier (ID)

In operation 3003, the opening mediation server 310 may register the event requested by the profile providing server 330. The opening mediation server 310 may store an event identifier, a profile providing server address, and a profile providing server unique object identifier (object ID or OID) provided in operation 3002.

When, in operation 3002, the profile providing server 330 has allowed use of an event checking function, or the event checking function is allowed by a contract condition between the profile providing server 330 and the opening mediation server 310, the opening mediation server 310 may, in operation 3004, selectively generate an event checking identifier (ECID) corresponding to an identifier (EID) of an eUICC in a terminal (not illustrated), transferred by the profile providing server 330. In addition, the opening mediation server 310 may recycle an existing event checking identifier (ECID) connected to the corresponding eUICC identifier (EID), or may use an event checking identifier (ECID) provided by the profile providing server 330.

In operation 3004, the opening mediation server 310 may connect the event checking identifier (ECID) with the identifier (EID) of the eUICC in the terminal (not illustrated) so as to store the event.

In operation 3005, the opening mediation server 310 may reply with an event registration response message (Register Event Response) to notify the profile providing server 330 of a result of the event registration.

Figure 4:
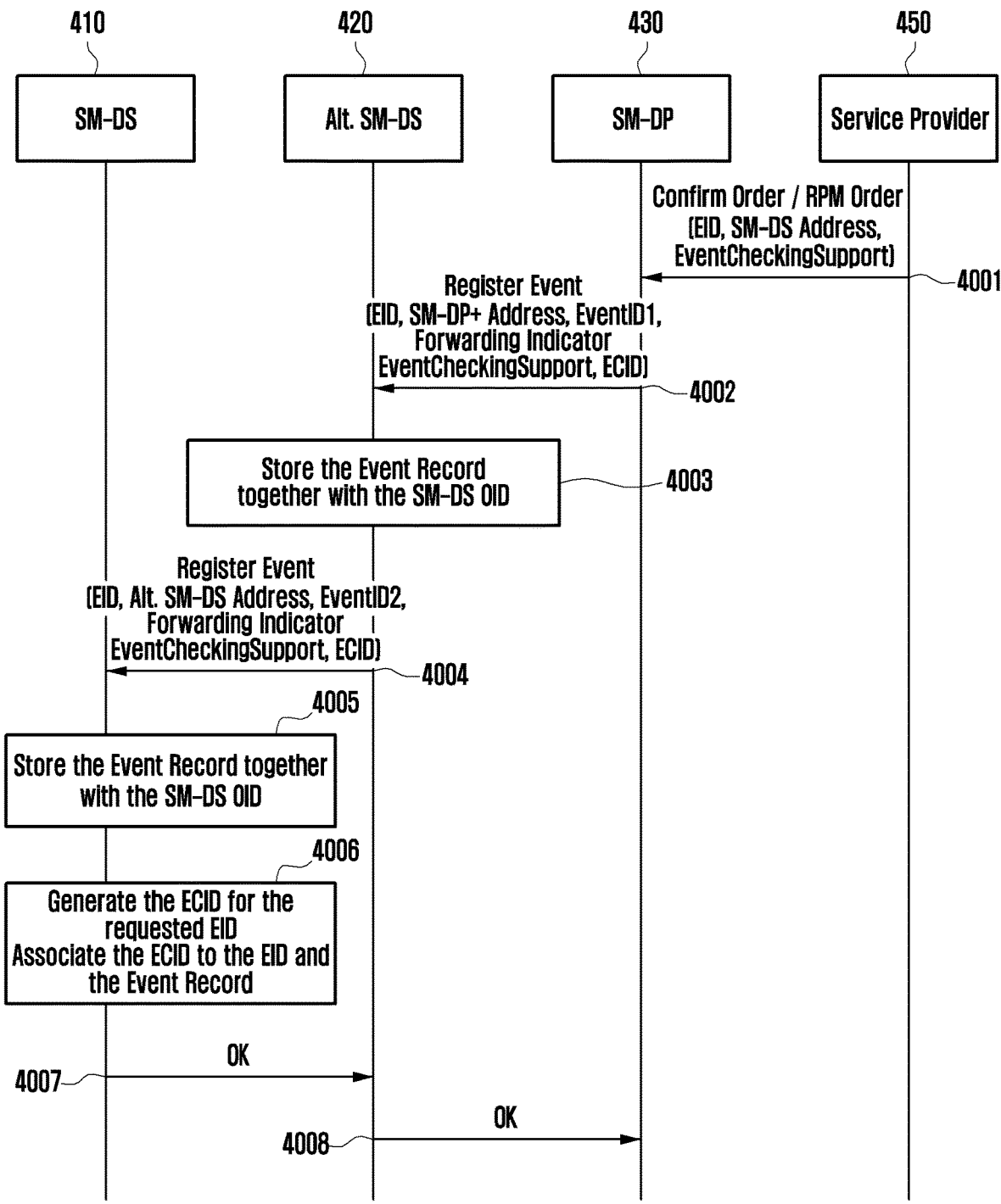
FIG. 4 is a diagram illustrating a message exchange procedure in which a profile providing server consecutively registers event generation in multiple opening mediation servers according to an embodiment of the disclosure.

FIG. 4 is a diagram illustrating a message exchange procedure in which a profile providing server consecutively registers event generation in multiple opening mediation servers according to an embodiment of the disclosure.

Referring to FIG. 4, in operation 4001, an operator 450 may command a profile providing server 430 (e.g., SM-DP) to generate an event corresponding to at least one of commands for remote management of a profile to be downloaded or a profile installed in a terminal. The operator 450 may selectively include at least one of the following pieces of information in a command to generate the event.

Identifier (eUICC ID or EID) of an eUICC in a terminal (not illustrated) aimed for by the event,
Address (SM-DS address) of at least one opening mediation server in which information of a generated event is to be registered in the opening mediation server, and/or
Identifier (EventCheckingSupport) indicating whether the opening mediation server is allowed to use an event checking function for the corresponding event In operation 4001, the profile providing server 430 may generate an event according to a request of the operator 450.

In operation 4002, the profile providing server 430 may register the generated event in an alternative opening mediation server 420 (e.g., Alt. SM-DS). For example, the event registration operation according to operation 4002 may include an operation of transmitting, to the alternative opening mediation server 420, an event registration request message (Register Event Request) selectively including at least one of the following pieces of information.

Event identifier (EventID1 or MatchingID),
Identifier (eUICC ID or EID) of an eUICC in a terminal (not illustrated),
Address (SM-DP+ address) of the at least one profile providing server 430,
Forwarding indicator configured as "True",
Identifier (EventCheckingSupport) indicating whether use of an event checking function is allowed, and/or
Event checking identifier (ID)

In operation 4003, the alternative opening mediation server 420 may register the event requested by the profile providing server 430. The alternative opening mediation server 420 may store an event identifier, a profile providing server address, and a profile providing server unique object identifier (object ID or OID) provided in operation 4002. In addition, in operation 4003, the alternative opening mediation server 420 may generate new event identifier 2 (EventID2).

In operation 4004, the alternative opening mediation server 420 may register the generated event in an opening mediation server 410 (e.g., SM-DS). For example, the event registration operation according to operation 4004 may include an operation of transmitting, to the opening mediation server 410, an event registration request message (Register Event Request) selectively including at least one of the following pieces of information.

Event identifier (EventID2),
Identifier (eUICC ID or EID) of an eUICC in a terminal (not illustrated),
Address (SM-DP+ address) of the at least one profile providing server 430,
Forwarding indicator configured as "False",
Identifier (EventCheckingSupport) indicating whether use of an event checking function is allowed, and/or
Event checking identifier (ID)

In operation 4005, the opening mediation server 410 may register the event requested by the alternative opening mediation server 420. The opening mediation server 410 may store event identifier 2, an alternative opening mediation server address, and an alternative opening mediation server unique object identifier (object ID or OID) provided in operation 4004. When, in operation 4002, the profile providing server 430 has allowed use of an event checking function, or the event checking function is allowed by a contract condition between the profile providing server 420, the opening mediation server 410, and the alternative opening mediation server 420, the opening mediation server 410 may, in operation 4006, selectively generate an event checking identifier (ECID) corresponding to an identifier (EID) of an eUICC in a terminal (not illustrated), transferred by the alternative opening mediation server 420. In addition, the opening mediation server 410 may recycle an existing event checking identifier (ECID) connected to the corresponding eUICC identifier (EID), or may use an event checking identifier (ECID) provided by the profile providing server 430.

In operation 4006, the opening mediation server 410 may connect the event checking identifier (ECID) with the identifier (EID) of the eUICC in the terminal (not illustrated) so as to store the event.

In operation 4007, the opening mediation server 410 may reply with an event registration response message (Register Event Response) to notify the alternative opening mediation server 420 of a result of the event registration.

In operation 4008, after receiving the response message, the alternative opening mediation server 420 may reply with an event registration response message (Register Event Response) to notify the profile providing server 430.

Figure 5:
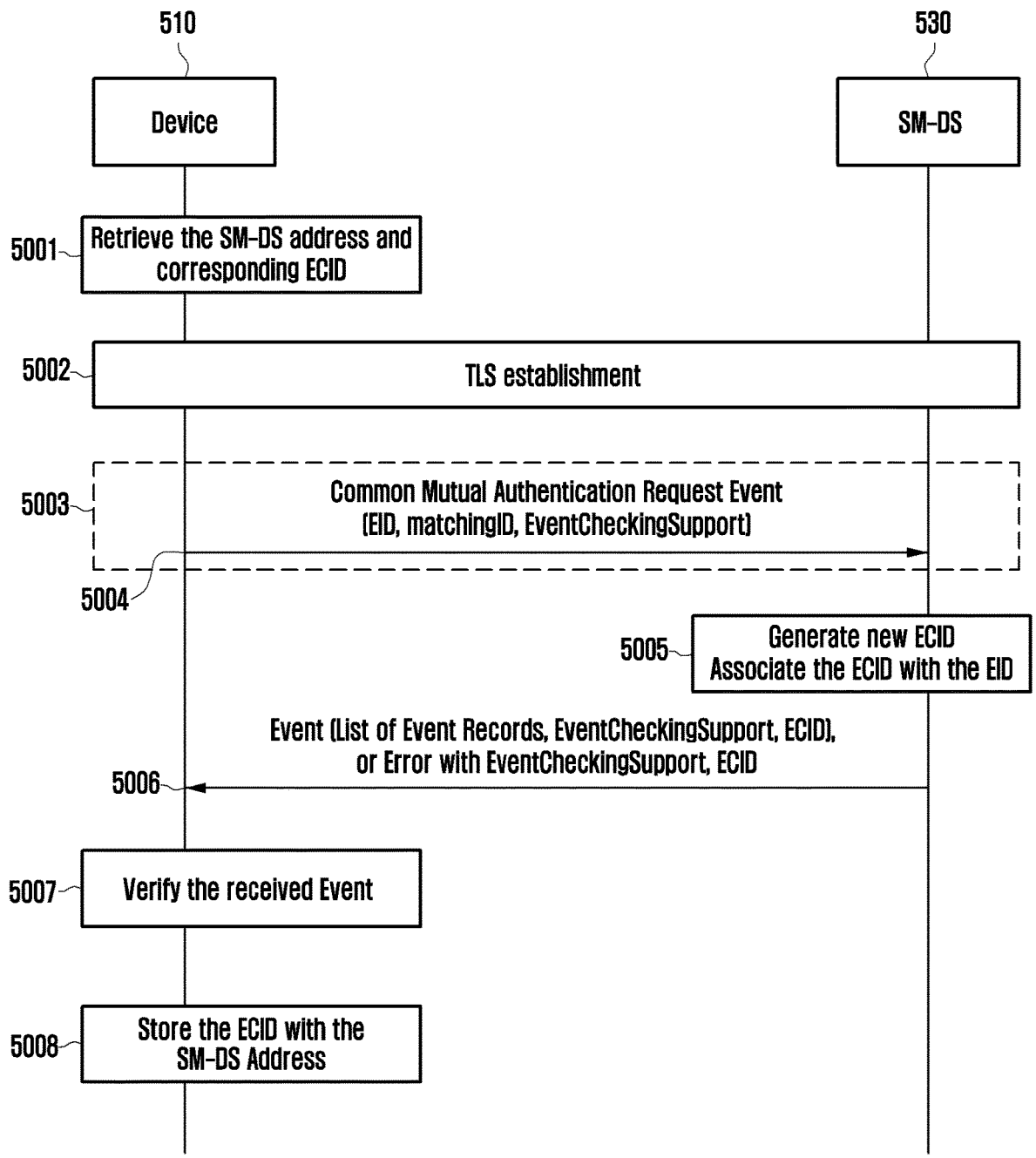
FIG. 5 is a diagram illustrating a message exchange procedure of a case where a terminal and an opening mediation server operate in relation to issue or registration of an event checking identifier according to an embodiment of the disclosure.

FIG. 5 is a diagram illustrating a message exchange procedure of a case where a terminal and an opening mediation server operate in relation to issue or registration of an event checking identifier according to an embodiment of the disclosure.

Referring to FIG. 5, a terminal 510 may be used together with an LPA (not illustrated) or an eSIM (not illustrated). Further, the terminal 510 may include LPA or eSIM.

In operation 5001, an LPA (not illustrated) of the terminal 510 may obtain information of at least one opening mediation server 530 (e.g., SM-DS), stored in an eSIM (not illustrated) or the LPA (not illustrated) in the terminal 510. For example, operation 5001 may be performed by initial booting of the terminal, rebooting thereof, input of a profile installation command by a user, or identification of a profile remote management command by the user. The information of the opening mediation server in operation 5001 may selectively include at least one of the following contents.

Address of at least one opening mediation server, and/or
 Event checking identifier (ECID) usable for the opening mediation server An address of an opening mediation server may not exist in the terminal 510, and an event checking identifier usable for the corresponding opening mediation server may not exist, or an event checking identifier may exist but is not valid.

The event checking identifier may be stored with an issue date, a validity period, and a validity date, and when the period expires, may not be valid. In addition, the number of times the event checking identifier can be used may be designated, and when the number of time of usage is exceeded, the same identifier may not be valid.

When the terminal 510 supports a function of event checking or acquisition using an opening mediation server, and obtains an address of the at least one opening mediation server 530 in operation 5001, the LPA of the terminal 510 may, in operation 5002, establish a transport layer security (TLS) connection with the opening mediation server 530.

When the LPA of the terminal 510 supports an event checking function, but has failed to obtain an event checking identifier usable for the current opening mediation server 530 in operation 5001, the terminal 510 may perform, with the opening mediation server 530, a mutual authentication process for event acquisition in operation 5003. The mutual authentication may be certificate-based mutual authentication in which the eSIM (or eUICC) of the terminal 510 and the opening mediation server authenticates each other by using an asymmetric key configured by a pair of a public key (PK) and a secret key (SK).

During the mutual authentication process, the terminal 510 may, in operation 5004, transfer, to the opening mediation server 530, a request to obtain an event related to the eSIM mounted in the terminal 510. Before the corresponding request is transferred, the eSIM may authenticate the opening mediation server 530. The corresponding request may selectively include at least one of the following pieces of information.

eUICC identifier (EID),
 Event identifier (EventID or MatchingID),
 Event checking function support identifier of the terminal 510,
 Event checking identifier issue request (EcidRequest),
 eUICC signature generated by a secret key of the eUICC,
 eUICC certificate and high level certificate, and/or
 Identifier of supporting an opening mediation server signature verification function Some or all of the pieces of information may be included in eUICC information (euiccInfo) or terminal information (deviceInfo) and then be transferred to the opening mediation server.

In operation 5004, the opening mediation server 530 may verify the eUICC identifier, the eUICC signature, and the eUICC certificate to authenticate the eUICC.

In operation 5005, when supporting an event checking function, the opening mediation server 530 may generate an event checking identifier (ECID) corresponding to the eUICC identifier (EID). The opening mediation server 530 may generate a new event checking identifier, or may reuse a previously stored event checking identifier. In addition, the opening mediation server 530 may associate the current eUICC identifier (EID) with the event checking identifier (ECID) and store the same identifiers. The generation of the event checking identifier may be selectively performed when an event checking identifier issue request (EcidRequest) is received from the terminal 510 in operation 5004, or may be selectively performed according to determination by the opening mediation server 530 without a new event checking identifier issue request (EcidRequest) of the terminal 510.

In operation 5005, the opening mediation server 530 may configure and store at least one of an issue data of the event checking identifier, a validity period thereof, a validity date thereof, and the number of times the same identifier can be used. In addition, the event checking identifier may not be valid due to period expiration or excess of the number of times of usage, and an event checking identifier may be newly generated.

In operation 5005, the opening mediation server 530 may search for a registered event corresponding to the requested eUICC identifier (EID), or eUICC identifier (EID) and event identifier.

In operation 5006, the opening mediation server 530 may reply with an event request response message. The event request response message may selectively include at least one of the following contents.

Event list: Event identifier (event ID or matching ID) and RSP server address, the event list may be empty,
 Support/non-support of an event checking function,
 Event checking identifier, and/or
 Event checking identifier validity condition (validity period, validity date, next event checking identifier issue required date, next event acquisition request required date, the number of times of usage, or the like)

During operation 5003, when the terminal 510 has transferred, through the identifier of supporting an opening mediation server signature verification function, that the terminal is able to verity a signature of the opening mediation server 530, the opening mediation server 530 may sign some or all of the pieces of information with a secret key of the opening mediation server 530.

In operation 5006, when there is no event corresponding to the eUICC identifier of the terminal 510 and the requested event identifier, the opening mediation server 530 may recognize the event identifier as a false event identifier, and reply with an error. When the mutual authentication process has been successfully performed, the opening mediation server may selectively reply with at least one of support/non-support of an event checking function or an event checking identifier together with an error message.

In operation 5007, when a reply value of the opening mediation server 530 includes the signature of the opening mediation server 530, the terminal 510 may verify the signature. When the verification fails, the terminal 510 may stop the process and display an error to the user (not illustrated). When the signature of the opening mediation server 530 is verified, the terminal 510 may proceed to operation 5008 when the verification is successful.

In operation 5008, the terminal 510 may store, in the terminal 510, the address of the opening mediation server 530 from which a reply is currently received, and the received event checking identifier. The received information may be stored in the LPA (not illustrated) installed in the terminal 510, or the eSIM (or eUICC (not illustrated)) mounted in the terminal 510.

Figure 6:
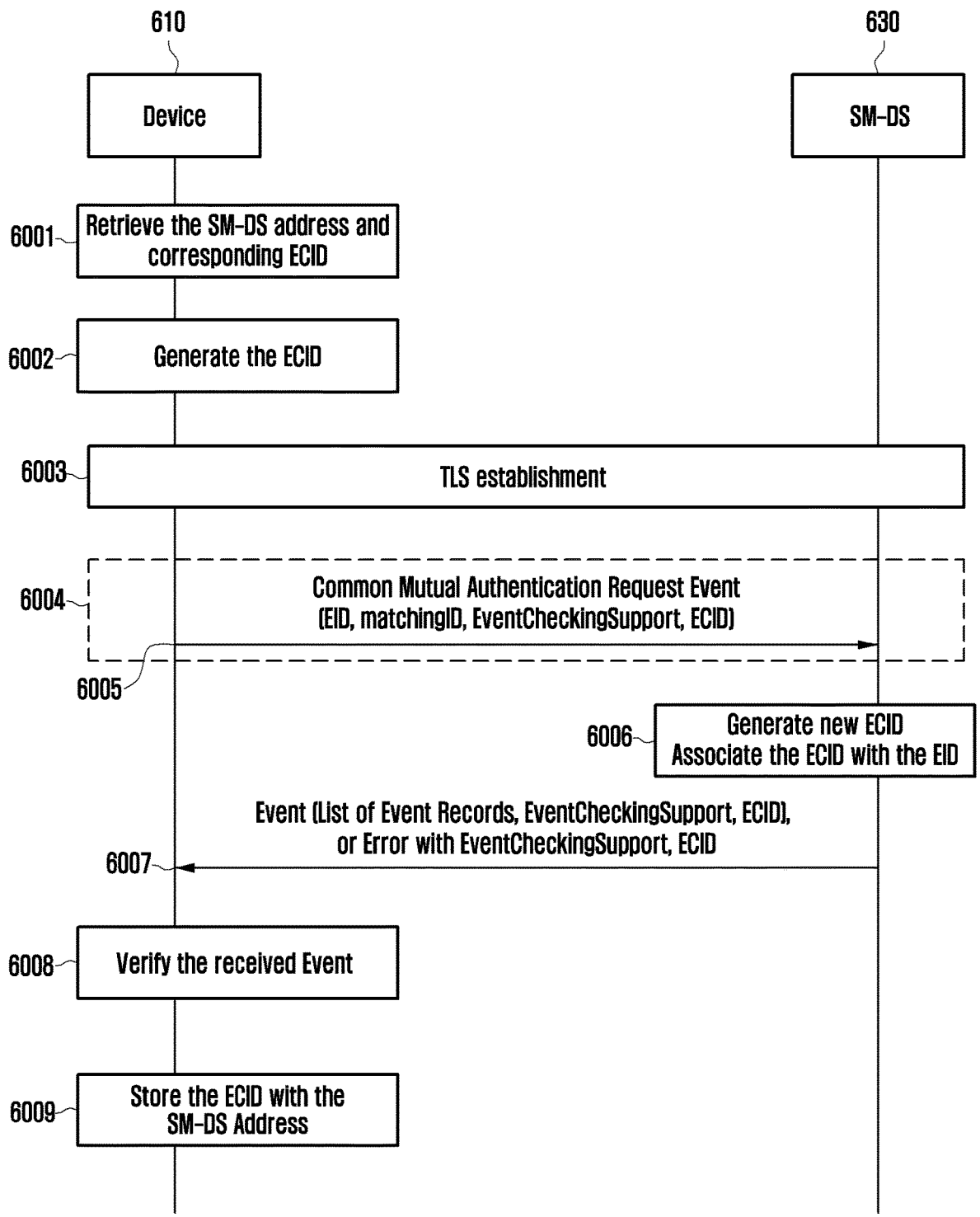
FIG. 6 is a diagram illustrating a message exchange procedure of a case where a terminal and an opening mediation server operate in relation to issue or registration of an event checking identifier according to an embodiment of the disclosure.

FIG. 6 is a diagram illustrating a message exchange procedure of a case where a terminal and an opening mediation server operate in relation to issue or registration of an event checking identifier according to an embodiment of the disclosure.

Referring to FIG. 6, a terminal 610 may be used together with an LPA (not illustrated) or an eSIM (not illustrated). Further, the terminal 610 may include LPA or eSIM.

In operation 6001, an LPA (not illustrated) of the terminal 610 may obtain information of at least one opening mediation server 630 (e.g., SM-DS), stored in an eSIM (not illustrated) or the LPA (not illustrated) in the terminal 610. For example, operation 6001 may be performed by initial booting of the terminal, rebooting thereof, input of a profile installation command by a user, or identification of a profile remote management command by the user. The information of the opening mediation server in operation 6001 may selectively include at least one of the following contents.

Address of at least one opening mediation server, and/or
Event checking identifier (ECID) usable for the opening mediation server An address of an opening mediation server may not exist in the terminal 610, and an event checking identifier usable for the corresponding opening mediation server may not exist, or an event checking identifier may exist but is not valid.

The event checking identifier may be stored with an issue date, a validity period, and a validity date, and when the period expires, may not be valid. In addition, the number of times the event checking identifier can be used may be designated, and when the number of time of usage is exceeded, the same identifier may not be valid.

In operation 6002, the terminal 610 may generate an event checking identifier. The terminal 610 may generate an event checking identifier when an event checking identifier is not valid or does not exist in operation 6001.

When the terminal 610 supports a function of event checking or acquisition using an opening mediation server, and obtains an address of the at least one opening mediation server 630 in operation 6001, the LPA of the terminal 610 may, in operation 6003, establish a TLS connection with the opening mediation server 630.

In operation 6004, the terminal 610 may perform, with the opening mediation server 630, a mutual authentication process for event acquisition. The mutual authentication may be certificate-based mutual authentication in which the eSIM (or eUICC) of the terminal 610 and the opening mediation server authenticates each other by using an asymmetric key configured by a pair of a public key (PK) and a secret key (SK).

During the mutual authentication process, the terminal 610 may, in operation 6005, transfer, to the opening mediation server 630, a request to obtain an event related to the eSIM mounted in the terminal 610. Before the corresponding request is transferred, the eSIM may authenticate the opening mediation server 630. The corresponding request may selectively include at least one of the following pieces of information.

eUICC identifier (EID),
Event identifier (EventID or MatchingID),
Event checking function support identifier of the terminal 610,
Event checking identifier,
Event checking identifier validity condition (validity period, validity date, the number of times of usage, or the like),
eUICC signature generated by a secret key of the eUICC,
eUICC certificate and high level certificate, and/or
Identifier of supporting an opening mediation server signature verification function Some or all of the pieces of information may be included in eUICC information (euiccInfo) or terminal information (deviceInfo) and then be transferred to the opening mediation server 630.

In operation 6005, the opening mediation server 630 may verify the eUICC identifier, the eUICC signature, and the eUICC certificate to authenticate the eUICC.

In operation 6006, when supporting an event checking function, the opening mediation server 630 may associate the current eUICC identifier (EID) with the event checking identifier (ECID) and store the same identifiers. In addition, when the event checking identifier transferred by the terminal 610 is a value which the opening mediation server 630 is unable to use (e.g., existence of an overlapping ECID), the opening mediation server 630 may generate a new event checking identifier. The opening mediation server 630 may store together at least one of an issue data of the event checking identifier, a validity period thereof, a validity date thereof, and the number of times the same identifier can be used.

In operation 6006, the opening mediation server 630 may search for a registered event corresponding to the requested eUICC identifier (EID), or eUICC identifier (EID) and event identifier.

In operation 6007, the opening mediation server 630 may reply with an event request response message. The event request response message may selectively include at least one of the following contents.

Event list: Event identifier (event ID or matching ID) and RSP server address, the event list may be empty,
Support/non-support of an event checking function,
Event checking identifier, and/or
Event checking identifier validity condition (validity period, validity date, next event checking identifier issue required date, next event acquisition request required date, the number of times of usage, or the like)

During operation 6004, when the terminal 610 has transferred, through the identifier of supporting an opening mediation server signature verification function, that the terminal is able to verity a signature of the opening mediation server 630, the opening mediation server 630 may sign some or all of the pieces of information with a secret key of the opening mediation server 630.

In operation 6006, when there is no event corresponding to the eUICC identifier of the terminal 610 and the requested event identifier, the opening mediation server 630 may recognize the event identifier as a false event identifier, and reply with an error. When the mutual authentication process has been successfully performed, the opening mediation server may selectively reply with at least one of support/non-support of an event checking function or an event checking identifier together with an error message.

In operation 6008, when a reply value of the opening mediation server 630 includes the signature of the opening mediation server 630, the terminal 610 may verify the signature. When the verification fails, the terminal 610 may stop the process and display an error to the user (not illustrated). When the signature of the opening mediation server 630 is verified, the terminal 610 may proceed to operation 6009 when the verification is successful.

In operation 6009, the terminal 610 may store, in the terminal 610, the address of the opening mediation server 630 from which a reply is currently received, and the received event checking identifier. The received information may be stored in the LPA (not illustrated) installed in the terminal 610, or the eSIM (or eUICC (not illustrated)) mounted in the terminal 610.

Figure 7:
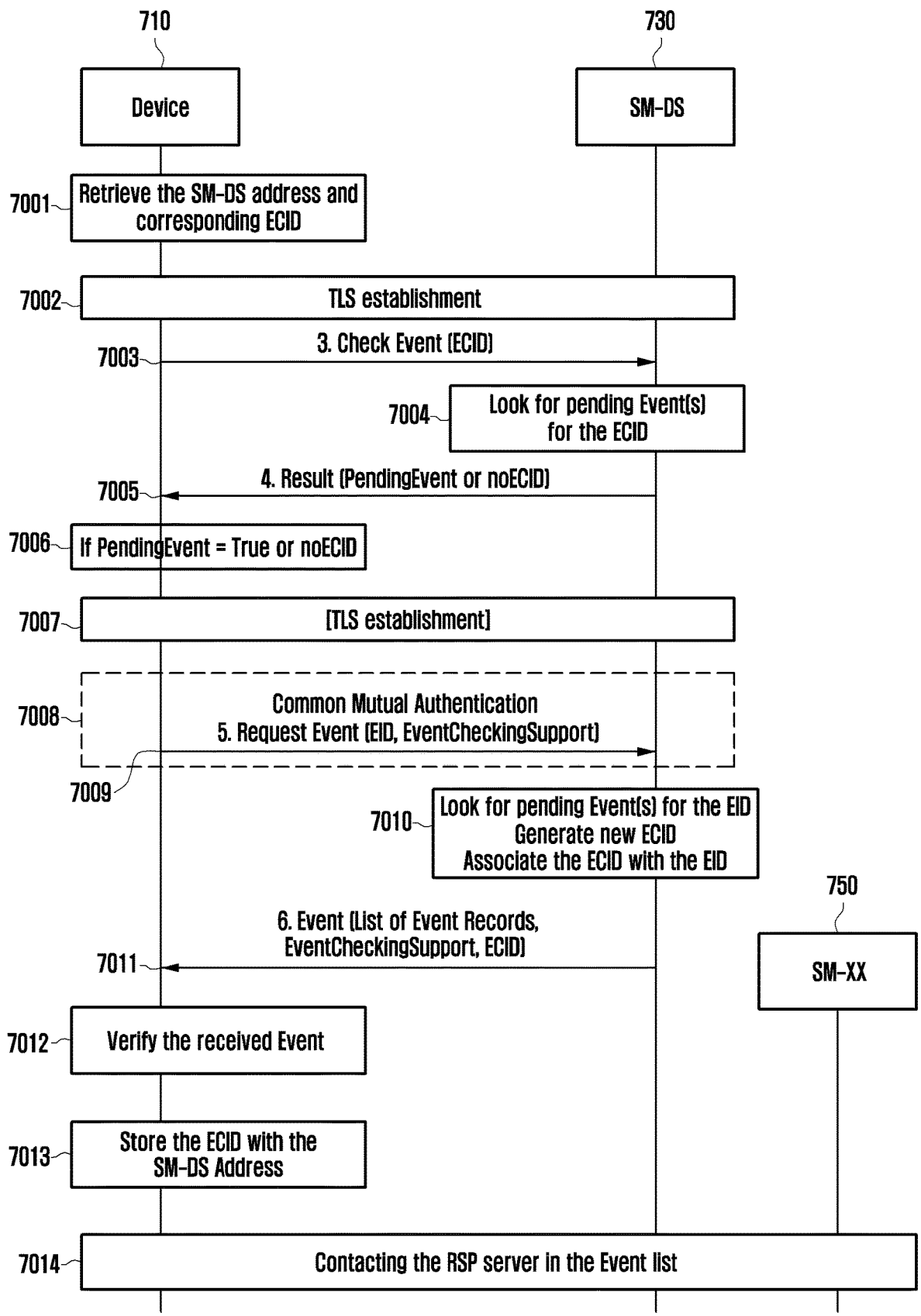
FIG. 7 is a diagram illustrating a message exchange procedure of a case where a terminal and an opening mediation server perform an event checking operation by using an event checking identifier according to an embodiment of the disclosure.

FIG. 7 is a diagram illustrating a message exchange procedure of a case where a terminal and an opening mediation server perform an event checking operation by using an event checking identifier according to an embodiment of the disclosure.

Referring to FIG. 7, a terminal 710 may be used together with an LPA (not illustrated) or an eSIM (not illustrated). Further, the terminal 710 may include LPA or eSIM.

In operation 7001, an LPA (not illustrated) of the terminal 710 may obtain information of at least one opening mediation server 730 (e.g., SM-DS), stored in an eSIM (not illustrated) or the LPA (not illustrated) in the terminal 710. For example, operation 7001 may be performed by initial booting of the terminal, rebooting thereof, input of a profile installation command by a user, or identification of a profile remote management command by the user. The information of the opening mediation server in operation 7001 may selectively include at least one of the following contents.

Address of at least one opening mediation server, and/or
Event checking identifier (ECID) usable for the opening mediation server An address of an opening mediation server may not exist in the terminal 710, and an event checking identifier usable for the corresponding opening mediation server may not exist, or an event checking identifier may exist but is not valid.

The event checking identifier may be stored with an issue date, a validity period, a validity date, a next event checking identifier issue required date, a next event acquisition request required date, or the like, and when the period expires, may not be valid. In addition, the number of times the event checking identifier can be used may be designated, and when the number of time of usage is exceeded, the same identifier may not be valid. In addition, when the next event checking identifier issue required date is exceeded, the terminal may immediately proceed to operation 7007 and proceed to issue an event checking identifier. In addition, when the next event checking identifier issue required date is exceeded, the terminal may immediately proceed to operation 7007 and make an event acquisition request, and an event checking identifier may be issued together.

When the terminal 710 supports a function of event checking or acquisition using an opening mediation server, and obtains an address of the at least one opening mediation server 730 in operation 7001, the LPA of the terminal 710 may, in operation 7002, establish a TLS connection with the opening mediation server 730.

In operation 7003, the terminal 710 may transfer, to the opening mediation server 730, an event checking request so as to identify whether there is an event. The event checking request may include an event checking identifier (ECID) connected to the opening mediation server 730. In addition, the event checking request may selectively include a new event checking identifier issue request (EcidRequest).

In operation 7004, the opening mediation server 730 may search for an event related to the event checking identifier. In addition, the opening mediation server 730 may verify the validity of the corresponding event checking identifier. In addition, when the event checking identifier received according to the request of the terminal 710 in operation 7003 is valid, the opening mediation server 730 may selectively generate a new event checking identifier, and may associate the new event checking identifier with an eUICC identifier (EID) connected to the existing valid event checking identifier, and store the same identifiers. The generation of a new event checking identifier may be selectively performed when a new event checking identifier issue request (EcidRequest) is received from the terminal 710 or may be selectively performed according to determination by the opening mediation server 730 without a new event checking identifier issue request (EcidRequest) of the terminal 710.

In addition, the opening mediation server 730 may configure and store at least one of an issue data of the newly event checking identifier, a validity period thereof, a validity date thereof, and the number of times the same identifier can be used, and may discard the existing event checking identifier.

In operation 7005, the opening mediation server 730 may reply to the terminal 710 selectively with at least one of the following contents according to results of searching for an event and verifying the event checking identifier, which are performed in operation 7004.

Event existence/absence identifier: An event exists or does not exist,
Event checking identifier validity identifier (noECID): An event checking identifier is not valid,
New event checking identifier (newECID), and/or
New event checking identifier validity condition (validity period, validity date, next event checking identifier issue required date, next event acquisition request required date, the number of times of usage, or the like)

When the opening mediation server 730 does not support an even checking function, the opening mediation server 730 may also reply with an error that the corresponding function is not supported to the terminal.

In operation 7006, the terminal 710 may identify a reply of the opening mediation server 730. When absence of an event is identified in the reply of operation 7005, or an error is received, the terminal 710 may terminate the process. In addition, when a new event checking identifier is received through the reply of operation 7005, the terminal 710 may store, in the terminal 710, the address of the opening mediation server 730 from which a reply is currently received, and the received event checking identifier. The received information may be stored in the LPA (not illustrated) installed in the terminal 710, or the eSIM (or eUICC (not illustrated)) mounted in the terminal 710.

When existence of an event is identified in the reply of operation 7005 or the event checking identifier provided by the terminal 710 to the opening mediation server 730 in operation 7003 is identified not to be valid, the terminal 710 may perform a next step to obtain the event or update the event checking identifier.

In operation 7007, the terminal 710 may establish a connection with the opening mediation server 730. When the TLS connection established in operation 7002 is valid, the terminal 710 and the opening mediation server 730 may continuously use the existing TLS connection and may not perform operation 7007.

In operation 7008, the terminal 710 may perform, with the opening mediation server 730, a mutual authentication process for event acquisition or issuance of an event checking identifier. The mutual authentication may be certificate-based mutual authentication in which the eSIM (or eUICC) of the terminal 710 and the opening mediation server 730 authenticates each other by using an asymmetric key configured by a pair of a public key (PK) and a secret key (SK).

During the mutual authentication process, the terminal 710 may, in operation 7009, transfer, to the opening mediation server 730, a request to obtain an event related to the eSIM mounted in the terminal 710. Before the corresponding request is transferred, the eSIM may authenticate the opening mediation server 730. The corresponding request may selectively include at least one of the following pieces of information.

eUICC identifier (EID),
Event identifier (EventID or MatchingID),
Event checking function support identifier of the terminal 710,
Event checking identifier issue request (EcidRequest),
eUICC signature generated by a secret key of the eUICC,
eUICC certificate and high level certificate, and/or
Identifier of supporting an opening mediation server signature verification function Some or all of the pieces of information may be included in eUICC information (euiccInfo) or terminal information (deviceInfo) and then be transferred to the opening mediation server 730.

In operation 7009, the opening mediation server 730 may verify the eUICC identifier, the eUICC signature, and the eUICC certificate to authenticate the eUICC.

In operation 7010, the opening mediation server 730 may search for a registered event corresponding to the requested eUICC identifier (EID), or eUICC identifier (EID) and event identifier.

In operation 7010, when supporting an event checking function, the opening mediation server 730 may generate an event checking identifier (ECID) corresponding to the eUICC identifier (EID). The generation of the event checking identifier may be selectively performed when an event checking identifier issue request (EcidRequest) is received from the terminal 710 in operation 7008, or may be selectively performed according to determination by the opening mediation server 730 without a new event checking identifier issue request (EcidRequest) of the terminal 710.

The opening mediation server 730 may generate a new event checking identifier, or may reuse a previously stored event checking identifier. In addition, the opening mediation server 730 may associate the current eUICC identifier (EID) with the event checking identifier (ECID) and store the same identifiers.

In operation 7010, the opening mediation server 730 may configure and store at least one of an issue data of the event checking identifier, a validity period thereof, a validity date thereof, and the number of times the same identifier can be used. In addition, the event checking identifier may not be valid due to period expiration or excess of the number of times of usage, and an event identifier may be newly generated.

In operation 7011, the opening mediation server 730 may reply with an event request response message. The event request response message may selectively include at least one of the following contents.

Event list: Event identifier (event ID or matching ID) and RSP server address, the event list may be empty,
Support/non-support of an event checking function,
Event checking identifier, and/or
Event checking identifier validity condition (period, the number of times of usage, or the like)

During operation 7008, when the terminal 710 has transferred, through the identifier of supporting an opening mediation server signature verification function, that the terminal is able to verity a signature of the opening mediation server 730, the opening mediation server 730 may sign some or all of the pieces of information with a secret key of the opening mediation server 730.

In operation 7012, when a reply value of the opening mediation server 730 includes the signature of the opening mediation server 730, the terminal 710 may verify the signature. When the verification fails, the terminal 710 may stop the process and display an error to the user (not illustrated). When the signature of the opening mediation server 730 is verified, the terminal 710 may selectively proceed to operation 7013 when the verification is successful.

In operation 7013, the terminal 710 may store, in the terminal 710, the address of the opening mediation server 730 from which a reply is currently received, and the received event checking identifier. The received information may be stored in the LPA (not illustrated) installed in the terminal 710, or the eSIM (or eUICC (not illustrated)) mounted in the terminal 710.

In operation 7014, the terminal 710 may perform a process of using information in the received event list to access an RSP server (profile providing server or alternative opening mediation server) and perform the event.

Figure 8:
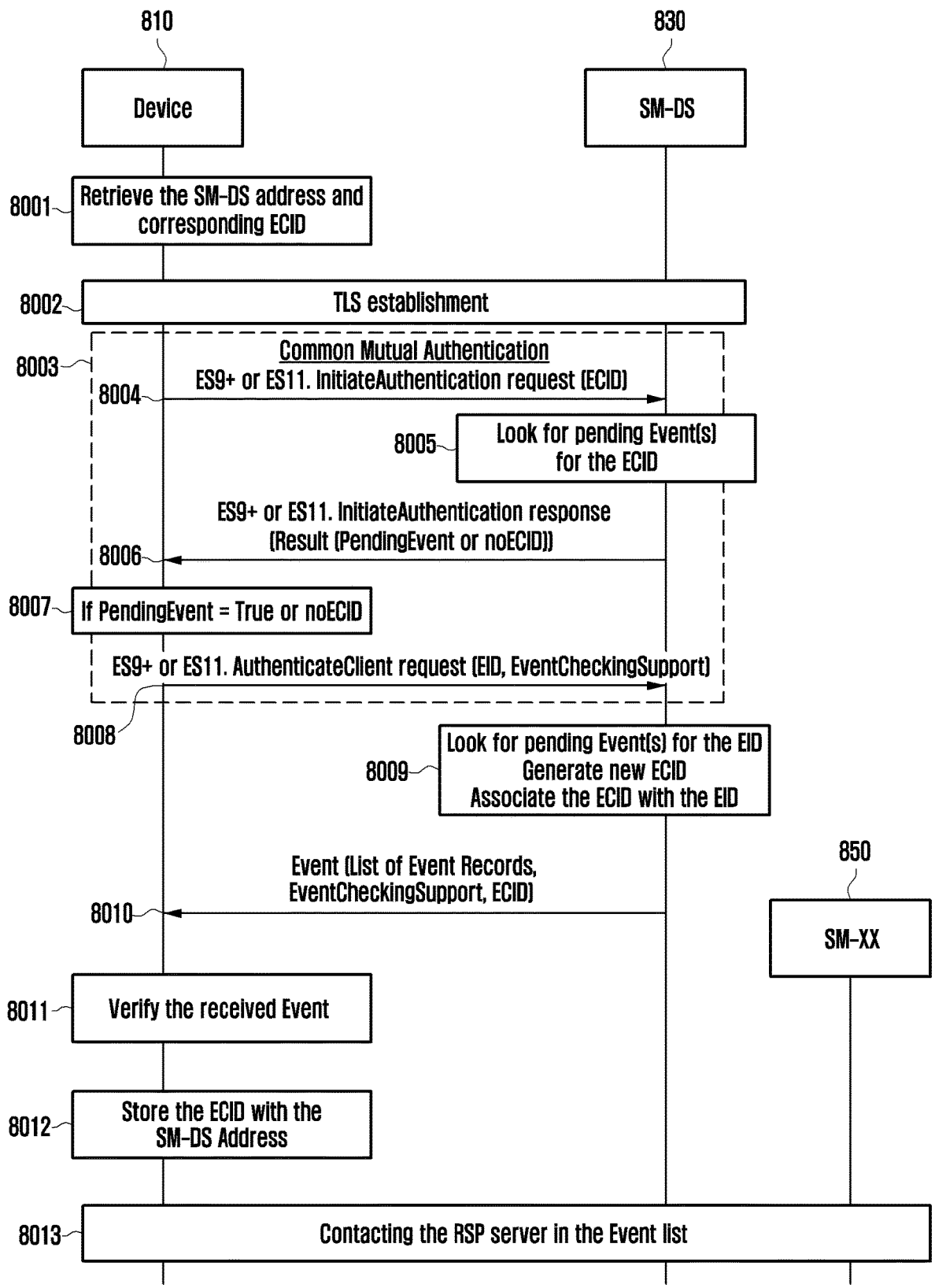
FIG. 8 is a diagram illustrating a message exchange procedure of a case where a terminal and an opening mediation server perform an event checking operation during a mutual authentication process therebetween using an event checking identifier according to an embodiment of the disclosure.

FIG. 8 is a diagram illustrating a message exchange procedure of a case where a terminal and an opening mediation server perform an event checking operation during a mutual authentication process therebetween using an event checking identifier according to an embodiment of the disclosure.

Referring to FIG. 8, a terminal 810 may be used together with an LPA (not illustrated) or an eSIM (not illustrated). Further, the terminal 810 may include LPA or eSIM.

In operation 8001, an LPA (not illustrated) of the terminal 810 may obtain information of at least one opening mediation server 830 (e.g., SM-DS), stored in an eSIM (not illustrated) or the LPA (not illustrated) in the terminal 810. For example, operation 8001 may be performed by initial booting of the terminal, rebooting thereof, input of a profile installation command by a user, or identification of a profile remote management command by the user. The information of the opening mediation server in operation 8001 may selectively include at least one of the following contents.

Address of at least one opening mediation server, and/or
Event checking identifier (ECID) usable for the opening mediation server An address of an opening mediation server may not exist in the terminal 810, and an event checking identifier usable for the corresponding opening mediation server may not exist, or an event checking identifier may exist but is not valid.

The event checking identifier may be stored with an issue date, a validity period, and a validity date, and when the period expires, may not be valid. In addition, the number of times the event checking identifier can be used may be designated, and when the number of time of usage is exceeded, the same identifier may not be valid.

When the terminal 810 supports a function of event checking or acquisition using an opening mediation server, and obtains an address of the at least one opening mediation server 830 in operation 8001, the LPA of the terminal 810 may, in operation 8002, establish a TLS connection with the opening mediation server 830.

In operation 8003, the terminal 810 may perform, with the opening mediation server 830, a mutual authentication process for event acquisition. The mutual authentication may be certificate-based mutual authentication in which the eSIM (or eUICC) of the terminal 810 and the opening mediation server authenticates each other by using an asymmetric key configured by a pair of a public key (PK) and a secret key (SK).

The terminal 810 may transfer a mutual authentication start request (InitiateAuthentication) of the terminal 810 to the opening mediation server 830 in operation 8004 of the mutual authentication process, and the corresponding request may selectively include at least one value among the following values.

- Event checking identifier (ECID) for identification whether an event exists,
- Arbitrary number value (euiccChallenge) generated in the eSIM mounted in the terminal 810,
- Information (euiccInfo or euiccInfo1) of the eSIM mounted in the terminal 810,
- Information of an RSP function supported by the LPA (not illustrated) installed in the terminal 810, and/or
- Address of the opening mediation server 830

The event checking identifier (ECID) may be included in at least one of information (euiccInfo or euiccInfo 1) of the eSIM mounted in the terminal 810 or information of an RSP function supported by the LPA (not illustrated) installed in the terminal 810, or may be independently included in a mutual authentication start request message.

In operation 8005, the opening mediation server 830 may search for an event related to the event checking identifier. In addition, the opening mediation server 830 may verify the validity of the corresponding event checking identifier.

In operation 8006, the opening mediation server 830 may selectively include, in a mutual authentication start (InitiateAuthentication) response, at least one of the following contents according to results of searching for an event and verifying the event checking identifier, which are performed in operation 8005, and then reply to the terminal 810 with the same response.

- Event existence/absence identifier: An event exists or does not exist
- Event checking identifier validity identifier: An event checking identifier is not valid When the opening mediation server 830 does not support an even checking function, the opening mediation server 830 may also reply with an error that the corresponding function is not supported. The reply value may be signed with a secret key of the opening mediation server 830, and the opening mediation server 830 may selectively include at least one of a signature, a certificate by which the signature can be verified, and a certificate chain.

In operation 8007, the terminal 810 may identify a reply of the opening mediation server 830. When, in the reply of operation 8006, failure of verification of the signature or the certificate of the opening mediation server 830 is identified, absence of an event is identified, or an error is received, the terminal 810 may terminate the process. When, in operation 8007, verification of the signature or the certificate of the opening mediation server 830 has succeeded and in the reply of operation 8006, existence of an event is identified or the event checking identifier provided by the terminal 810 to the opening mediation server 830 in operation 8004 is identified not to be valid, the terminal 810 may perform a next step to obtain the event or update the event checking identifier.

During the mutual authentication process, the terminal 810 may, in operation 8008, transfer, to the opening mediation server 830, a request to obtain an event related to the eSIM mounted in the terminal 810. Before the corresponding request is transferred, the eSIM may authenticate the opening mediation server 830. The corresponding request may selectively include at least one of the following pieces of information.

- eUICC identifier (EID),
- Event identifier (EventID or MatchingID),
- Event checking function support identifier of the terminal 810,
- eUICC signature generated by a secret key of the eUICC,
- eUICC certificate and high level certificate, and/or
- Identifier of supporting an opening mediation server signature verification function Some or all of the pieces of information may be included in eUICC information (euiccInfo2) or terminal information (deviceInfo) and then be transferred.

In operation 8008, the opening mediation server 830 may verify the eUICC identifier, the eUICC signature, and the eUICC certificate to authenticate the eUICC.

In operation 8009, the opening mediation server 830 may search for a registered event corresponding to the requested eUICC identifier (EID), or eUICC identifier (EID) and event identifier.

In operation 8009, when supporting an event checking function, the opening mediation server 830 may generate an event checking identifier (ECID) corresponding to the eUICC identifier (EID). The opening mediation server 830 may generate a new event checking identifier, or may reuse a previously stored event checking identifier. In addition, the opening mediation server 830 may associate the current eUICC identifier (EID) with the event checking identifier (ECID) and store the same identifiers.

In operation 8009, the opening mediation server 830 may configure and store at least one of an issue data of the event checking identifier, a validity period thereof, a validity date thereof, and the number of times the same identifier can be used. In addition, the event checking identifier may not be valid due to period expiration or excess of the number of times of usage, and an event identifier may be newly generated.

In operation 8010, the opening mediation server 830 may reply with an event request response message. The event request response message may selectively include at least one of the following contents.

- Event list: Event identifier (event ID or matching ID) and RSP server address, the event list may be empty,
- Support/non-support of an event checking function,
- Event checking identifier, and/or
- Event checking identifier validity condition (period, the number of times of usage, or the like)

During operation 8003 (operation 8004 or operation 8008), when the terminal 810 has transferred, through the identifier of supporting an opening mediation server signature verification function, that the terminal is able to verity a signature of the opening mediation server 830, the opening mediation server 830 may sign some or all of the pieces of information with the secret key of the opening mediation server 830.

In operation 8011, when a reply value of the opening mediation server 830 includes the signature of the opening mediation server 830, the terminal 810 may verify the signature. When the verification fails, the terminal 810 may stop the process and display an error to the user (not illustrated). When the signature of the opening mediation server 830 is verified, the terminal 810 may selectively proceed to operation 8012 when the verification is successful.

In operation 8012, the terminal 810 may store, in the terminal 810, the address of the opening mediation server 830 from which a reply is currently received, and the received event checking identifier. The received information may be stored in the LPA (not illustrated) installed in the terminal 810, or the eSIM (or eUICC (not illustrated)) mounted in the terminal 810.

In operation 8013, the terminal 810 may perform a process of using information in the received event list to access an RSP server (profile providing server or alternative opening mediation server) and perform the event.

Figure 9:
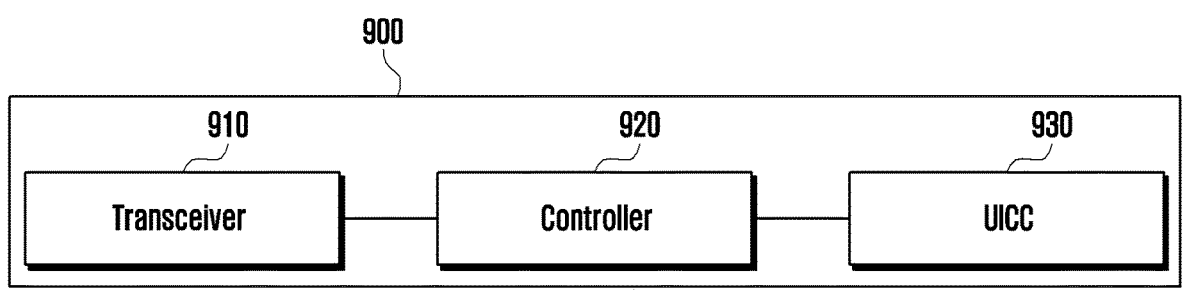
FIG. 9 is a diagram illustrating elements of a terminal according to an embodiment of the disclosure.

FIG. 9 is a diagram illustrating components of a terminal according to an embodiment of the disclosure.

Referring to FIG. 9, a terminal 900 may include a transceiver 910 and a controller 920 (for example, a processor). In addition, the terminal 900 may include a UICC 930. For example, the UICC 930 may be inserted into the terminal 900 or may be an eUICC embedded in the terminal 900.

Figure 10:
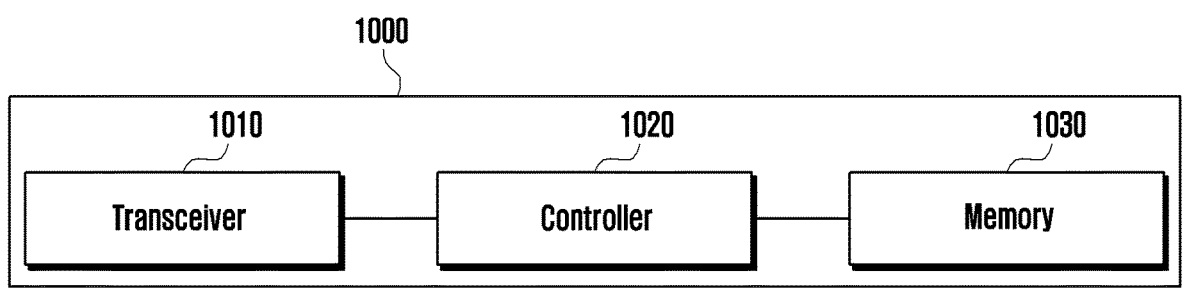
FIG. 10 is a diagram illustrating elements of a profile providing server according to an embodiment of the disclosure.
Figure 11:
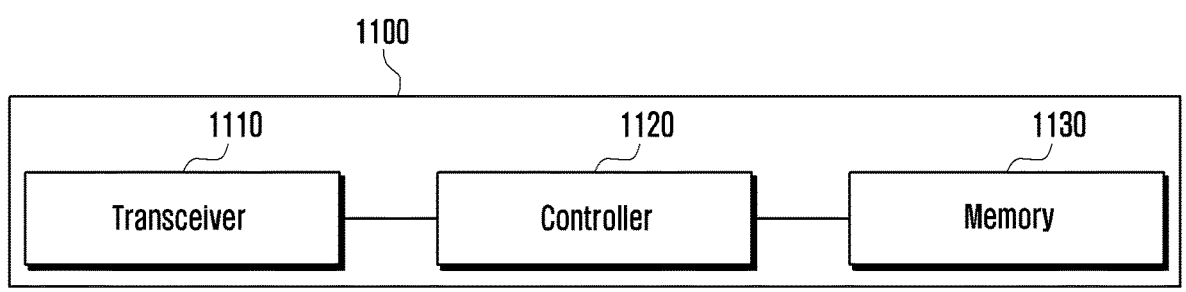
FIG. 11 is a diagram illustrating elements of an opening mediation server according to an embodiment of the disclosure.

The transceiver 910 according to various embodiments of the disclosure may transmit and receive signals, information, data, or the like, according to various embodiments of the disclosure with a profile providing server 1000 of FIG. 10 or an opening mediation server 1100 of FIG. 11.

For example, the transceiver 910 according to various embodiments of the disclosure may transmit a first message requesting an event to the opening mediation server 1100.

The transceiver 910 according to various embodiments of the disclosure may receive event-related information from the opening mediation server 1100 in response to the first message.

The transceiver 910 according to various embodiments of the disclosure may transmit a second message requesting an event to the profile providing server 1000 based on the event-related information.

For example, the opening mediation server 1100 according to various embodiments may include a first opening mediation server and a second opening mediation server.

The transceiver 910 according to various embodiments of the disclosure may transmit a third message requesting an event to the second opening mediation server based on second event-related information received from the first opening mediation server.

The transceiver 910 according to various embodiments of the disclosure may receive first event-related information from the second opening mediation server in response to the third message.

The transceiver 910 according to various embodiments of the disclosure may transmit the second message requesting an event to the profile providing server 1000 based on the first event-related information.

For example, the second message according to various embodiments of the disclosure may further include at least one of information related to an acquisition path of the first event-related information and information related to the second opening mediation server that has replied with the first event-related information.

In addition, the third message according to various embodiments of the disclosure may further include at least one of information related to an acquisition path of the second event-related information and the first opening mediation server that has replied with the second-event related information.

In addition, the transceiver 910 according to various embodiments of the disclosure may receive information related to event processing from the profile providing server 1000 in response to the second message.

For example, the information related to the event processing received from the profile providing server 1000 according to various embodiments of the disclosure may include information indicating an event processing failure.

The information related to the event processing received from the profile providing server 1000 according to various embodiments of the disclosure may include information related to profile installation or remote management.

The controller 920 may include at least one processor, and hereinafter the controller may be used interchangeably with the processor.

The controller 920 according to various embodiments of the disclosure may control the overall operation of the terminal 900. The controller 920 may control the overall operation of the terminal 900 according to various embodiments of the disclosure as described above.

For example, controller 920 according to various embodiments of the disclosure may identify an event processing exception list, and may determine whether to process the event based on the event-related information received from the opening mediation server 1100 and the event processing exception list.

In addition, the controller 920 according to various embodiments of the disclosure may control the transceiver 910 to transmit the second message requesting the event to the profile providing server 1000 based on the determining whether to process the event by controlling the transceiver 910 and the event-related information, may receive the information related to the event processing from the profile providing server 1000 in response to the second message, and may update the event processing exception list based on the information related to the event processing. For example, when the information related to the event processing received from the profile providing server 1000 includes information indicating an event processing failure, the controller 920 according to various embodiments of the disclosure may add the event-related information to the event processing exception list.

The UICC 930 according to various embodiments of the disclosure may download a profile and may install the profile. In addition, the UICC 930 may manage the profile.

The UICC 930 may operate under the control of the controller 920. Alternatively, the UICC 930 may include a processor or a controller for installing a profile, or an application may be installed therein. A part of the application may be installed in the controller 920.

Meanwhile, the terminal 900 may further include a memory (not shown), and may store data, such as a basic program, an application program, and configuration information for the operation of the UE 700. In addition, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM). In addition, the controller 920 may perform various operations using various programs, contents, data, or the like, stored in the memory.

FIG. 10 is a diagram illustrating components of a profile providing server according to an embodiment of the disclosure.

Referring to FIG. 10, a profile providing server 1000 according to various embodiments of the disclosure may include a transceiver 1010, a controller 1020 (for example, a processor), and a memory 1030.

The transceiver 1010 according to various embodiments of the disclosure may transmit and receive signals, information, data, and the like, according to various embodiments of the disclosure with the terminal 900 or an opening mediation server 1100 of FIG. 11. For example, the transceiver 1010 may transmit information related to profile installation or remote management to the terminal.

For example, the transceiver 1010 according to various embodiments of the disclosure may receive an event request message from the terminal 900.

For example, the event request message according to various embodiments of the disclosure may include event-related information, and the event-related information according to various embodiments of the disclosure may be based on information received by the terminal 900 from the opening mediation server 1100.

Meanwhile, the controller 1020 is a component for generally controlling the profile providing server 1000. The controller 1020 may include at least on processor, and hereinafter the controller may be used interchangeably with the processor.

The controller 1020 may control the overall operation of the profile providing server 1000 according to various embodiments of the disclosure as described above.

For example, the controller 1020 according to various embodiments of the disclosure may determine the validity of the event-related information included in the event request message received from the terminal 1000, and based on the validity determination of the event-related information, the transceiver 1010 may be controlled to transmit information related to event processing to the UE.

For example, when the event-related information is valid, event processing-related information according to various embodiments of the disclosure may include information related to profile installation or remote management.

In addition, when the event-related information is invalid, the event-related information according to various embodiments of the disclosure may include information indicating an event processing failure.

The controller 1020 according to various embodiments of the disclosure may control the transceiver 1010 to transmit an event deletion request message to the opening mediation server when event processing is completed.

The event request message according to various embodiments of the disclosure may further include at least one of information related to an acquisition path of event-related information and information related to the opening mediation server 1100.

The controller 1020 according to various embodiments of the disclosure may control the transceiver 1010 to transmit the event deletion request message to the opening mediation server 1100, based on at least one piece of the information related to the acquisition path of the event-related information and the information related to the opening mediation server 1100.

Meanwhile, the memory 1030 of the profile providing server 1000 may store data, such as a basic program, an application program, and configuration information for the operation of the profile proving server 1000. In addition, the memory may include at least one storage medium of a flash memory type, a hard disk type, a multimedia card micro type, a card type memory (e.g., SD or XD memory), a magnetic memory, a magnetic disk, an optical disk, a RAM, an SRAM, a ROM, a PROM, and an EEPROM. In addition, the controller 1020 may perform various operations using various programs, contents, data, or the like, stored in the memory.

FIG. 11 is a diagram illustrating components of an opening mediation server according to an embodiment of the disclosure.

Referring to FIG. 11, an opening mediation server 1100 according to various embodiments may include a transceiver 1110, a controller 1120 (for example, a processor), and a memory 1130.

The transceiver 1110 according to various embodiments of the disclosure may transmit and receive signals, information, data, or the like, according to various embodiments of the disclosure with the terminal 900 of FIG. 9 or the profile providing server 1000 of FIG. 10. For example, the transceiver 1110 may transmit event-related information to the terminal. For example, the transceiver 1110 according to various embodiments may receive an event request message from the terminal.

For example, the event request message according to various embodiments of the disclosure may include event-related information, and the event-related information according to various embodiments of the disclosure may be based on information received by the terminal 900 from another opening mediation server (not shown).

Meanwhile, the controller 1120 is a component for generally controlling the opening mediation server 1100. The controller may include at least one processor and hereinafter the controller may be used interchangeably with the processor.

The controller 1120 may control the overall operation of the opening mediation server 1100 according to various embodiments of the disclosure as described above.

For example, the controller 1120 according to various embodiments of the disclosure may control the transceiver 1110 to receive an event registration request message from the profile providing server 1000 or another opening mediation server (not shown) in order to register an event.

The controller 1120 according to various embodiments of the disclosure may register the event in response to the event registration request message.

The registered event according to various embodiments of the disclosure may be related to an event generated by the profile providing server 1000.

For example, when the transceiver 1110 receives the event registration request message from the other open mediation server, the registered event may be an event obtained by modulating the event generated by the profile providing server.

The controller 1120 according to various embodiments of the disclosure may control the transceiver 1110 to receive an event deletion request message from the profile providing server 1000, and based on the event deletion request message, the registered event may be deleted.

The event registration request message according to various embodiments of the disclosure may include information related to an event destruction time.

For example, the controller 1120 according to various embodiments of the disclosure may delete the event, based on the information related to an event destruction time.

The event registration request message according to various embodiments of the disclosure may include information related to an event deletion notification.

For example, the controller 1120 according to various embodiments of the disclosure may control the transceiver 1110 to notify the profile providing server 1000 of the event deletion based on the information related to the event deletion notification.

Meanwhile, the memory 1130 of the opening mediation server 1100 may store data, such as a basic program, an application program, and configuration information for the operation of the opening mediation server 1100. In addition, the memory may include at least one storage medium of a flash memory type, a hard disk type, a multimedia card micro type, a card type memory (e.g., a secure digital (SD) or extreme digital (XD) memory), a magnetic memory, a magnetic disk, an optical disk, a random access memory (RAM), a static RAM (SRAM), a read only memory (ROM), a programmable ROM (PROM), and an electrically erasable PROM (EEPROM). In addition, the controller 1120 may perform various operations using various programs, contents, data, or the like, stored in the memory.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments of the disclosure, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., a third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment of the disclosure, the "module" may be implemented in the form of an application-specific integrated circuit (ASIC).

Various embodiments as set forth herein may be implemented as software (e.g., a program) including instructions that are stored in a storage medium (e.g., an internal memory or an external memory) that is readable by a machine (e.g., a computer). The machine is a device that can invoke the stored instructions from the storage medium, and operate according to the invoked instructions, and may include terminals (e.g., a first terminal or a second terminal) according to various embodiments of the disclosure. When the instructions are executed by a processor, the processor may perform functions corresponding to the instructions, with or without using one or more other components under the control of the processor. The instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., a module or a program) of the above-described elements may include a single entity or multiple entities. According to various embodiments of the disclosure, one or more of the above-described elements may be omitted, or one or more other elements may be added. Alternatively or additionally, a plurality of elements (e.g., modules or programs) may be integrated into a single element. In such a case, according to various embodiments of the disclosure, the integrated element may still perform one or more functions of each of the plurality of elements in the same or similar manner as they are performed by a corresponding one of the plurality of elements before the integration. According to various embodiments of the disclosure, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a subscription manager discovery service (SM-DS) server in a wireless communication system, the method comprising:
    performing a mutual authentication procedure with a terminal, wherein the performing of the mutual authentication procedure comprises receiving, from the terminal, device information including information indicating that the terminal supports an event checking;
    generating an event checking identifier (ECID) associated with an embedded universal integrated circuit card (eUICC) identifier (EID) in case that the SM-DS server supports the event checking, based on the performing of the mutual authentication procedure, wherein the ECID is an identifier (ID) for determining a presence of event records registered for an eUICC; and transmitting, to the terminal, a message including the ECID, wherein the ECID is stored in the terminal and associated with an address of the SM-DS server.

2. The method of claim 1, further comprising:

receiving, from the terminal, a request message for an-the event-check checking, the request message including the ECID corresponding to the SM-DS server; and verifying whether the ECID is valid.

3. The method of claim 2, further comprising:

checking whether there is an event associated with the ECID; and transmitting, to the terminal, information on whether there is the event associated with the ECID.

4. The method of claim 2, further comprising:

transmitting, to the terminal, an error message indicating that the ECID is not valid, in case that the verification fails.

5. The method of claim 2, further comprising:

transmitting, to the terminal, an error message in case that the SM-DS server does not support the event checking.

6. A method performed by a terminal in a wireless communication system, the method comprising:

performing a mutual authentication procedure with a subscription manager discovery service (SM-DS) server, wherein the performing of the mutual authentication procedure comprises transmitting, to the SM-DS server, device information including information indicating that the terminal supports an event checking;

receiving, from the SM-DS server, a message including an event checking identifier (ECID) associated with an embedded universal integrated circuit card (eUICC) identifier (EID), wherein the ECID is an identifier (ID) for determining a presence of event records registered for an eUICC; and storing the ECID associated with an address of the SM-DS server.

7. The method of claim 6, further comprising:

transmitting, to the SM-DS server, a request message for the event checking, the request message including the ECID corresponding to the SM-DS server, wherein whether the ECID is valid is verified based on the request message.

8. The method of claim 7, further comprising:

receiving, from the SM-DS server, information on whether there is an event associated with the ECID.

9. The method of claim 7, further comprising:

receiving, from the SM-DS server, an error message indicating that the ECID is not valid, in case that the verification fails.

10. The method of claim 7, further comprising:

receiving, from the SM-DS server, an error message in case that the SM-DS server does not support the event checking.

11. A subscription manager discovery service (SM- DS) server in a wireless communication system, the SM-DS server comprising:

a transceiver; and at least one processor coupled with the transceiver and configured to:

perform a mutual authentication procedure with a terminal, wherein, for performing the mutual authentication procedure, the at least one processor is configured to receive, from the terminal, device information including information indicating that the terminal supports an event checking, generate an event checking identifier (ECID) associated with an embedded universal integrated circuit card (eUICC) identifier (EID) in case that the SM-DS server supports the event checking. based on the performing of the mutual authentication procedure, wherein the ECID is an identifier (ID) for determining a presence of event records registered for an eUICC, and transmit, to the terminal, a message including the ECID, wherein the ECID is stored in the terminal and associated with an address of the SM-DS server.

12. The SM-DS server of claim 11, wherein the at least one processor is further configured to:

receive, from the terminal, a request message for the event checking, the request message including the ECID corresponding to the SM-DS server, and verify whether the ECID is valid.

13. The SM-DS server of claim 12, wherein the at least one processor is further configured to:

transmit, to the terminal, an error message indicating that the ECID is not valid, in case that the verification fails; and transmit, to the terminal, information on whether there is an event associated with the ECID, in case that the ECID is valid.

14. A terminal in a wireless communication system, 14. the terminal comprising:

a transceiver; and at least one processor coupled with the transceiver and configured to:

perform a mutual authentication procedure with a subscription manager discovery service (SM-DS) server, wherein, for performing the mutual authentication procedure with the SM-DS server, the at least one processor is configured to transmit, to the SM-DS server, device information including information indicating that the terminal supports an event checking, receive, from the SM-DS server, a message including an event checking identifier (ECID) associated with an embedded universal integrated circuit card (eUICC) identifier (EID), wherein the ECID is an identifier (ID) for determining a presence of event records registered for an eUICC, and store the ECID associated with an address of the SM-DS server.

15. The terminal of claim 14, wherein the at least one processor is further configured to transmit, to the SM-DS server, a request message for the check checking, the request message including the ECID corresponding to the SM-DS server, and wherein whether the ECID is valid is verified based on the request message.

* * * * *